US008378826B2

(12) United States Patent
Mercier et al.

(10) Patent No.: US 8,378,826 B2
(45) Date of Patent: Feb. 19, 2013

(54) KEY DEVICE FOR MONITORING SYSTEMS

(75) Inventors: Michael Mercier, Charlotte, NC (US);
James Gordon Wyatt, Jr., Waxhaw, NC (US); Lee H. Eckert, Waxhaw, NC (US);
Gary Mark Shafer, Charlotte, CA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 0 days.

(21) Appl. No.: 12/896,577

(22) Filed: Oct. 1, 2010
(Under 37 CFR 1.47)

(65) Prior Publication Data
US 2011/0084840 A1 Apr. 14, 2011

Related U.S. Application Data

(60) Provisional application No. 61/248,269, filed on Oct. 2, 2009.

(51) Int. Cl.
*G08B 13/14* (2006.01)
(52) U.S. Cl. .................................. 340/572.1
(58) Field of Classification Search .... 340/572.1–572.9, 340/5.21, 5.6; 713/193
See application file for complete search history.

(56) References Cited

U.S. PATENT DOCUMENTS

| 3,752,960 A | 8/1973 | Walton |
| 3,816,708 A | 6/1974 | Walton |
| 3,961,323 A | 6/1976 | Hartkorn |
| 3,984,807 A | 10/1976 | Haemmig |
| 4,021,807 A | 5/1977 | Culpepper et al. |
| 4,036,308 A | 7/1977 | Dellenberg |
| 4,063,229 A | 12/1977 | Welsh et al. |
| 4,141,006 A | 2/1979 | Braxton |
| 4,141,078 A | 2/1979 | Bridges, Jr. et al. |
| 4,209,787 A | 6/1980 | Freeny, Jr. |
| 4,223,830 A | 9/1980 | Walton |
| 4,225,953 A | 9/1980 | Simon et al. |
| 4,242,663 A | 12/1980 | Slobodin |
| 4,327,353 A * | 4/1982 | Beard et al. ................ 340/5.3 |
| 4,336,531 A | 6/1982 | Kincaid |
| 4,366,481 A | 12/1982 | Main et al. |
| 4,453,636 A | 6/1984 | Meadows et al. |
| 4,857,893 A | 8/1989 | Carroll |
| 4,862,160 A | 8/1989 | Ekchian et al. |
| 4,866,661 A | 9/1989 | de Prins |

(Continued)

FOREIGN PATENT DOCUMENTS

| EP | 1 316 814 A1 | 6/2003 |
| EP | 1 610 258 A1 | 12/2005 |

(Continued)

OTHER PUBLICATIONS

Wailgum, Thomas; "RFID Tags Arrive on Store Floor as Retailers Go After ROI"; Network World at http://www.networkworld.com/news/2010/072810-rfid-tags-arrive-on-store.html; ; Jul. 28, 2010; 2 pages.

(Continued)

*Primary Examiner* — Phung Nguyen
(74) *Attorney, Agent, or Firm* — Alston & Bird LLP

(57) ABSTRACT

Exemplary systems, methods and other means for providing a key device that may be used with a monitoring system are discussed herein. The key device may be configured to communicate with one or more other devices, silence an alarm, commission a tag, decommission a tag, unlock a tag from an item, among other things. The key device may include rules that permit particular functionality based on, for example, time and/or location.

39 Claims, 8 Drawing Sheets

U.S. PATENT DOCUMENTS

| | | | |
|---|---|---|---|
| 4,870,391 A | 9/1989 | Cooper | |
| 4,881,061 A | 11/1989 | Chambers | |
| 4,907,845 A | 3/1990 | Wood | |
| 4,918,432 A | 4/1990 | Pauley et al. | |
| 4,924,210 A | 5/1990 | Matsui et al. | |
| 4,926,161 A | 5/1990 | Cupp | |
| 4,951,029 A | 8/1990 | Severson | |
| 4,961,533 A | 10/1990 | Teller et al. | |
| 5,006,830 A | 4/1991 | Merritt | |
| 5,014,206 A | 5/1991 | Scribner et al. | |
| 5,019,815 A | 5/1991 | Lemelson et al. | |
| 5,031,098 A | 7/1991 | Miller et al. | |
| 5,057,677 A | 10/1991 | Bertagna et al. | |
| 5,059,951 A | 10/1991 | Kaltner | |
| 5,099,226 A | 3/1992 | Andrews | |
| 5,099,227 A | 3/1992 | Geiszler et al. | |
| 5,103,222 A | 4/1992 | Hogen Esch et al. | |
| 5,119,070 A | 6/1992 | Matsumoto et al. | |
| 5,119,104 A | 6/1992 | Heller | |
| 5,153,842 A | 10/1992 | Diugos, Sr. et al. | |
| 5,214,409 A | 5/1993 | Beigel | |
| 5,214,410 A | 5/1993 | Verster | |
| 5,218,343 A | 6/1993 | Stobbe et al. | |
| 5,288,980 A | 2/1994 | Patel et al. | |
| 5,317,309 A | 5/1994 | Vercellotti et al. | |
| 5,365,516 A | 11/1994 | Jandrell | |
| 5,396,224 A | 3/1995 | Dukes et al. | |
| 5,446,701 A | 8/1995 | Utke et al. | |
| 5,543,797 A | 8/1996 | Hochstein et al. | |
| 5,596,313 A | 1/1997 | Berglund et al. | |
| 5,671,362 A | 9/1997 | Cowe et al. | |
| 5,874,896 A | 2/1999 | Lowe et al. | |
| 5,942,978 A | 8/1999 | Shafer | |
| 5,955,951 A * | 9/1999 | Wischerop et al. | 340/572.8 |
| 6,380,894 B1 | 4/2002 | Boyd et al. | |
| 6,486,769 B1 | 11/2002 | McLean | |
| 6,703,934 B1 | 3/2004 | Nijman et al. | |
| 6,762,691 B2 | 7/2004 | Piazza | |
| 6,861,954 B2 | 3/2005 | Levin | |
| 7,061,367 B2 * | 6/2006 | Mosgrove et al. | 340/5.21 |
| 7,109,867 B2 | 9/2006 | Forster | |
| 7,148,805 B2 * | 12/2006 | Hogan | 340/572.9 |
| 7,336,183 B2 | 2/2008 | Reddy et al. | |
| 7,604,178 B2 * | 10/2009 | Stewart | 235/492 |
| 7,657,740 B2 | 2/2010 | Numao et al. | |
| 7,717,326 B2 | 5/2010 | Kumhyr et al. | |
| 7,755,485 B2 * | 7/2010 | Howard et al. | 340/572.1 |
| 2002/0153418 A1 * | 10/2002 | Maloney | 235/384 |
| 2003/0145441 A1 | 8/2003 | Andersson et al. | |
| 2003/0160697 A1 | 8/2003 | Sedon et al. | |
| 2004/0104817 A1 | 6/2004 | Wijk | |
| 2004/0160304 A1 | 8/2004 | Mosgrove et al. | |
| 2005/0242921 A1 | 11/2005 | Zimmerman et al. | |
| 2005/0242957 A1 | 11/2005 | Lindsay et al. | |
| 2006/0022815 A1 | 2/2006 | Fischer et al. | |
| 2006/0059367 A1 | 3/2006 | Yarvis | |
| 2006/0081020 A1 | 4/2006 | Hsiao et al. | |
| 2006/0092016 A1 | 5/2006 | Modes et al. | |
| 2007/0018787 A1 | 1/2007 | Martinet de Velasco Cortina et al. | |
| 2007/0050261 A1 | 3/2007 | Lin | |
| 2007/0120669 A1 | 5/2007 | Belden, Jr. | |
| 2007/0290802 A1 | 12/2007 | Batra et al. | |
| 2008/0122610 A1 | 5/2008 | Muirhead | |
| 2008/0174404 A1 | 7/2008 | Gopalan et al. | |
| 2008/0174437 A1 | 7/2008 | Arguin | |
| 2008/0246613 A1 | 10/2008 | Linstrom et al. | |
| 2008/0273684 A1 | 11/2008 | Profanchik | |
| 2009/0051536 A1 | 2/2009 | Lahiri | |
| 2009/0198529 A1 * | 8/2009 | Burkholder et al. | 705/7 |
| 2009/0224918 A1 | 9/2009 | Copeland | |
| 2009/0229327 A1 | 9/2009 | Valade, Jr. et al. | |
| 2009/0309736 A1 | 12/2009 | Heurtier | |
| 2010/0097223 A1 * | 4/2010 | Kruest et al. | 340/572.1 |
| 2010/0102929 A1 | 4/2010 | Haumann | |
| 2010/0133126 A1 | 6/2010 | Shute et al. | |
| 2010/0141445 A1 | 6/2010 | Venkatasubramaniyam et al. | |

FOREIGN PATENT DOCUMENTS

| | | |
|---|---|---|
| FR | 2 862 999 | 6/2005 |
| JP | 2000 238817 | 9/2000 |
| WO | WO 98/16849 | 4/1998 |
| WO | WO 01/06401 A1 | 1/2001 |
| WO | WO 2004/018811 A1 | 3/2004 |
| WO | WO 2006/076348 A2 | 7/2006 |
| WO | WO 2006/081650 A1 | 8/2006 |
| WO | WO 2007/070103 A1 | 6/2007 |
| WO | WO 2007/142595 A1 | 12/2007 |
| WO | WO 2008/055323 A2 | 5/2008 |
| WO | WO 2008/055323 A2 | 5/2008 |

OTHER PUBLICATIONS

International Search Report and Written Opinion for International Application No. PCT/US2009/066572; mailed Nov. 8, 2010.
International Search Report and Written Opinion for International Application No. PCT/US2010/051141 mailed Feb. 15, 2011.
International Search Report and Written Opinion for International Application No. PCT/US2010/049653, mailed Dec. 6, 2010.
Ward, Andy, et al., "A New Location Technique for the Active Office"; IEEE Personal Communication; Oct. 1997; pp. 42-47.
International Search Report and Written Opinion for International Application No. PCT/US2010/049520, mailed Mar. 17, 2011;17 pages.

* cited by examiner

| Rules implemented by Key Device | Level 1 Customer | Level 2 VIP Customer | Level 3 Sales Clerk Store A | Level 3 Sales Clerk Store B | Level 4 Manager Store A | Level 4 Manager Store B | Level 5 Regional Manager / traveling associate | Level 6 Executive |
|---|---|---|---|---|---|---|---|---|
| Receive product information from in-store network and/or receive shopping advice and/or provide other marketing information from in-store network | Enabled | Enabled | Enabled | Enabled | Enabled | Enabled | Enabled | Enabled |
| Unlock pre-designated device(s) to view/handle retail item | Disabled | Enabled | Enabled | Enabled | Enabled | Enabled | Enabled | Enabled |
| Commission tag | Disabled | Disabled | Enabled | Enabled | Enabled | Enabled | Enabled | Enabled |
| Decommission tag at Store A | Disabled | Disabled | Enabled | Disabled | Enabled | Disabled | Enabled | Enabled |
| Decommission tag at Store B | Disabled | Disabled | Disabled | Enabled | Disabled | Enabled | Enabled | Enabled |
| Zone/Department based rules within store | Enabled | Enabled | Enabled | Enabled | Disabled | Disabled | Disabled | Disabled |
| Limit at least some functionality to business hours or other time period | Enabled | Enabled | Enabled | Disabled | Enabled | Enabled | Disabled | Disabled |
| Active within Store A and deactivate while outside Store A | Enabled | Enabled | Disabled | Enabled | Enabled | Disabled | Disabled (Active outside Store A) | Disabled (Active outside Store A) |
| Activate within Store B and deactivate while outside Store B | Enabled | Enabled | Disabled | Enabled | Disabled | Enabled | Disabled (Active outside Store B) | Disabled (Active outside Store B) |
| Unlock tote upon receipt of proper tote code | Disabled | Disabled | Disabled | Disabled | Enabled | Enabled | Enabled | Enabled |
| Alert of remote alarm condition | Disabled | Disabled | Enabled | Enabled | Enabled | Enabled | Enabled | Enabled |

FIG. 3A

KEY DEVICE FOR MONITORING SYSTEMS

CROSS-REFERENCE TO RELATED APPLICATION

This patent application claims priority to U.S. Provisional Patent Application No. 61/248,269, filed Oct. 2, 2009, titled "KEY FOR COMMISSIONING, DECOMMISSIONING AND UNLOCKING CONFIGURABLE MONITORING DEVICES," which is hereby incorporated by reference in its entirety.

FIELD

Embodiments of the present invention relate generally to monitoring device technology and, more particularly, relate to keys configured to communicate with monitoring devices and/or monitoring systems that are used to track and/or monitor items, such as retail products.

BACKGROUND

Conventional retail security devices, such as passive Radio Frequency ID (RFID) tags or electronic article surveillance (EAS) tags perform limited roles within retail security systems. Furthermore, the typical roles of such tags are static. For example, once configured at the time of manufacturing, an EAS tag can only operate within the role of a device that facilitates triggering the sounding of an alarm when the device passes through an EAS gate. As such, RFID tags and EAS tags are often one dimensional, or at least relatively limited in their ability to enhance operations of a retail store or other entity.

Similarly, the keys used to remove the EAS tags from an item, are equally one dimensional. Many EAS tags can be removed with a mechanical and/or magnetic key. However, in the event that a key comes into the possession of an unauthorized individual, the individual may use such a key to disarm the EAS tags, which makes it easier to steal valuable items from retail outlets.

A number of problems have been identified with various prior systems and methods and embodiments discussed herein provide exemplary solutions to these problems.

BRIEF SUMMARY

Discussed herein are example embodiments of the present invention, some of which may enable the provision of a configurable monitoring device and corresponding network that may have a relatively high degree of flexibility in terms of employment and configuration. In this regard, some embodiments may provide a key that commissions, decommissions, unlocks, silences, and/or disarms monitoring devices when one or more predetermined conditions are satisfied. In some exemplary embodiments, the monitoring system, utilizing one or more keys in accordance with some examples discussed herein, may be employed to provide flexible functionality for enhancing product security within a retail sales and/or any other type of environment that may have a number of discrete items moving thereabout (e.g., library, airport, train station, manufacturing plant, transportation system infrastructure, etc.).

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3A shows an exemplary data structure of usage rules that may be associated with one or more levels of functionality in accordance with some embodiments discussed herein;

DETAILED DESCRIPTION

Figure 1A:
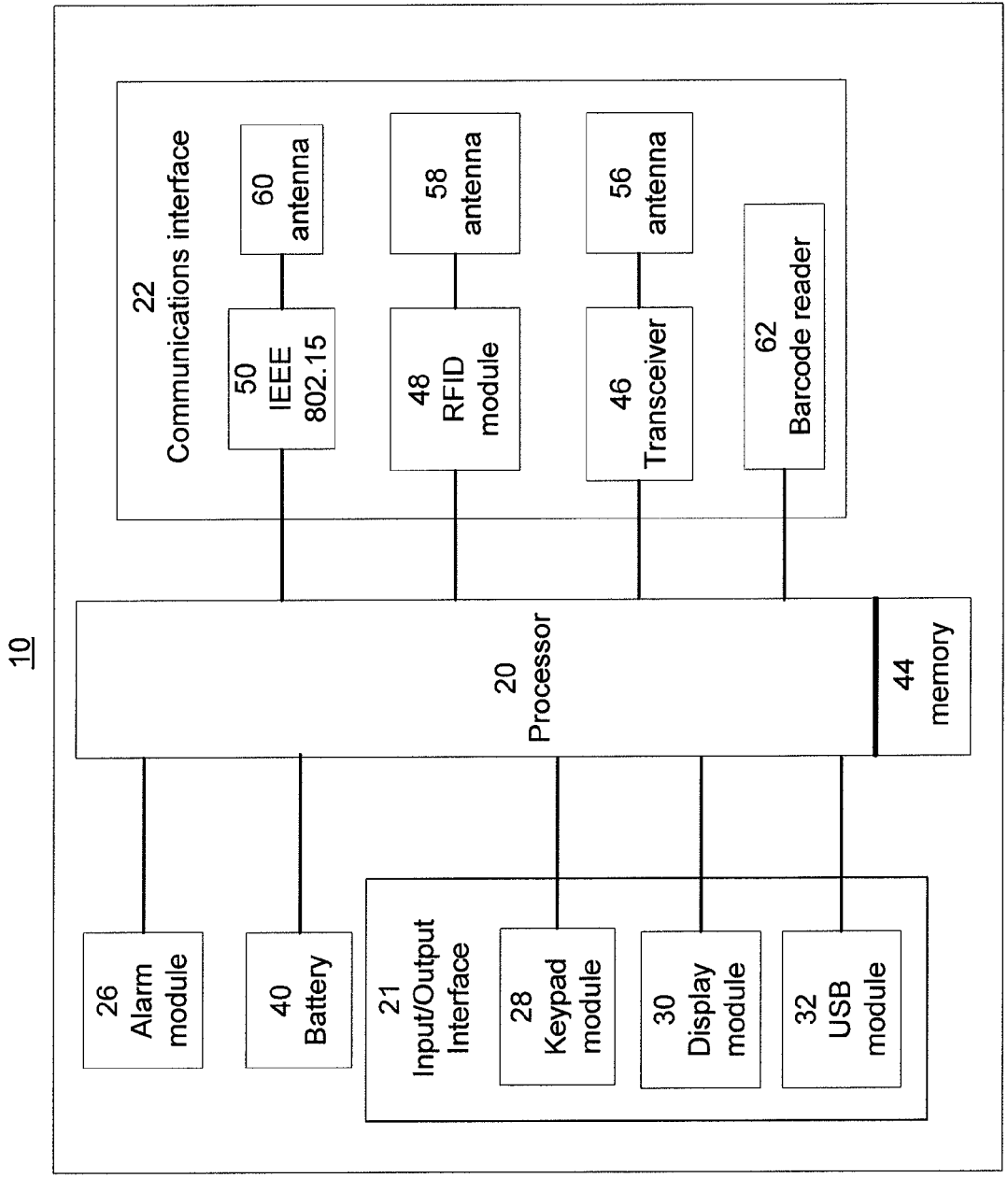
FIGS. 1A-1C show a diagram of various aspects of an exemplary key device, including exemplary internal and external components in accordance with some exemplary embodiments discussed herein.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1A is a block diagram showing various functional and physical components of key device 10 according to exemplary embodiments. Key device 10 can be used to, among other things, commission, decommission, disarm, silence, and/or physically (e.g., mechanically, electromechanically, etc.) unlock various types of tags. As referred to herein, tags may include traditional EAS tags, RFID tags, and/or any other type of monitoring device configured to discourage theft, track an item's location and/or perform any other functionality enabled by one or more monitoring systems.

In some embodiments, the monitoring device may be, for example, a configurable monitoring device that may be dynamically configurable over-the-air and/or otherwise to change its functionality, change its role within a network of configurable monitoring devices and/or change its modes of operation. As an example, a configurable monitoring device of an exemplary embodiment may be originally configured to provide network support for inventory management or marketing functions. Via wireless communication, the configurable monitoring device may have its configuration changed to provide theft deterrence, product tracking or other retail functions. The multi-mode and dynamically configurable nature of the configurable monitoring device may provide for increased utility of a monitoring system that may be employed to monitor products in retail or other operational environments. Examples of monitoring devices, including configuring monitoring devices, are discussed in U.S. patent application Ser. Nos. 12/636,564, 12/628,863 and 12/887,228, which are hereby incorporated by reference in its entirety.

In some embodiments discussed herein, the monitoring device may be mounted or otherwise placed within an environment being monitored to facilitate the monitoring activity desired in the environment. For example, monitoring devices may be strategically placed within shopping malls, shopping centers, retail stores and/or the parking lots of retail stores (e.g., on light posts within the parking lot) to facilitate performing various security, marketing, and inventory functionalities. A plurality of monitoring devices may form a network (e.g., a mesh network, star network, hybrid mesh/star network, or the like) of devices used for handling various different roles in connection with monitoring the environment in which such devices are distributed. One or more monitoring devices may be affixed to respective products or other articles (e.g., retail products) to facilitate monitoring of the article to which each monitoring device is affixed.

In some embodiments, each monitoring device may be configured to have a corresponding role (e.g., as a tag, node, etc.) via configuration information that may be dynamically provided thereto or dynamically selected to define the mode of operation of the respective monitoring device. The configuration information may include software and/or firmware instructions that may be stored and/or executed at the monitoring device to define the configuration and therefore the operation of the monitoring device. Meanwhile, one or more other monitoring devices may be configured (e.g., dynamically in some cases) to take on a different role, such as being a node device, with which one or more devices in tag mode may communicate. As such, a network of multi-modal and flexibly (and dynamically) monitoring devices may be created to provide enhanced monitoring capability for the provision of real-time tracking, theft protection services, inventory services, marketing services and numerous other functions. Examples of uses for and various functionality that may be implemented by monitoring devices are discussed in U.S. patent application Ser. Nos. 12/636,564, 12/628,863 and 12/887,228 which were incorporated by reference in its entirety.

To support the various functionalities, a monitoring system may be constructed and operated using devices, such as monitoring devices, configured to function as nodes and tags. A node may be a communication point that, among other things, may be configured to periodically broadcast an identification signal. In some embodiments, one or more nodes may be stationary devices associated with one or more sales floor displays, areas of the sales floor, fitting rooms, storage rooms, and/or the like. Tags may be affixed to articles for purchase within a retail sales environment. The nodes may be configured to provide a wireless signal that may be received by tags that are within range. According to some example embodiments, the range of a node or the power of the signal provided by the node may be set based on the size of the area that the node is responsible for. For example, if the node is associated with a small floor display, the signal power may be relatively low. On the other hand, if a node is responsible for a large shelf unit, the signal power may be set to a higher level to ensure coverage of the entire shelf unit. Tags may be configured to receive a signal that is associated with a node and respond to the node indicating that the tag is now associated with the node, for example, because the tag is located on the floor display associated with the node. The tag may receive a unique identifier for a node that the tag has detected and may store the identifier. As such, the tag may know to which node the tag has been associated. Similarly, the node may receive a communication from a tag including a unique identifier of the tag, and the node may therefore know to which tags the node is associated with. Via these and other types of defined tag/node relationships, various functionalities, as mentioned above, may be implemented. Additional examples of system infrastructure are discussed in U.S. patent application Ser. Nos. 12/636,564, 12/628,863 and 12/887,228, which were incorporated by reference in its entirety.

Key device 10 may include a processor 20, input/output 21, and a wireless communication interface 22. In some example embodiments, the processor 20 may be part of a Linux single board computer (SBC) and configured to support and execute a Structured Query Language (SQL) server. The processor 20 may in turn communicate with, control or embody (e.g., via operation in accordance with corresponding instructions from a network device) an alarm module 26.

Figure 1C:
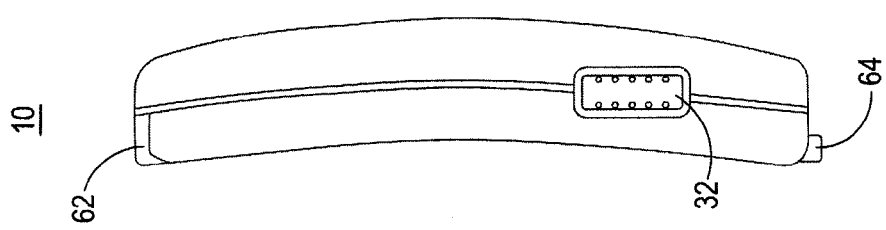
Figure 1B:
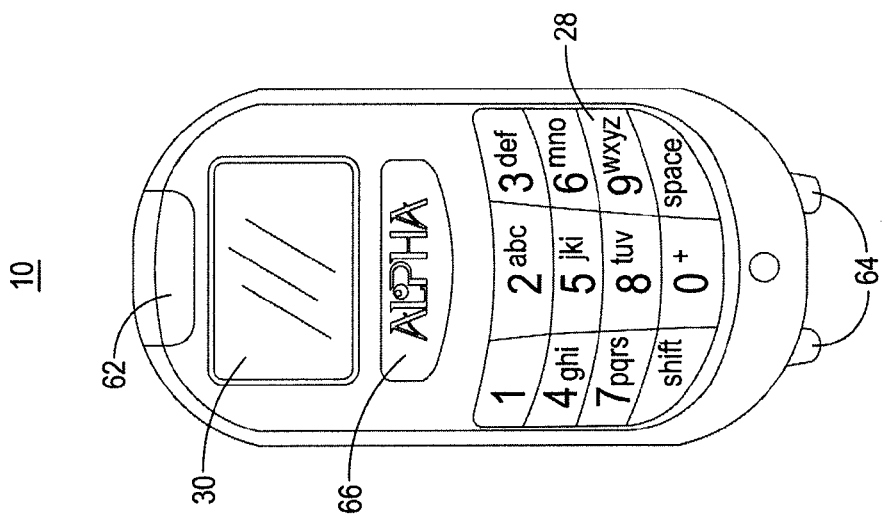

Processor 20 of key device 10 may include one or more physical components. Likewise, input/output interface 21 may control, for example, physical components comprising keypad module 28, display module 30, mini USB module 32, and button 66, examples of which are shown in FIGS. 1B and 1C. Battery 40 and a memory device 44 can also be included in key device 10. Communications interface 22 can comprise radio transmitter/receiver 46 and corresponding antenna 56, RFID module 48 and corresponding antenna 58, and module 50 and corresponding antenna 60. In some embodiments, in addition to radio transmitter/receiver module 46, key device 10 can also include a barcode reader module 62.

In exemplary embodiments, processor 20 may be configured (e.g., via execution of stored instructions or operation in accordance with programmed instructions) to control the operation of key device 10. Processor 20 may be embodied in a number of different ways. For example, processor 20 may be embodied as one or more of various processing means or devices such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, processor 20 may be configured to execute instructions stored in a memory device (e.g., memory device 44) or otherwise accessible to the processor 20. The instructions may be permanent (e.g., firmware) or modifiable (e.g., software) instructions. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to embodiments of the present invention while configured accordingly. Thus, for example, when processor 20 is embodied as an ASIC, FPGA or the like, processor 20 may be specifically configured hardware for conducting the operations described herein. Alternatively, as another example, when processor 20 is embodied as an executor of software or firmware instructions, the instructions may specifically configure processor 20 to perform the algorithms and/or operations described herein when the instructions are executed. Processor 20 may include, among other things, a clock, an arithmetic logic unit (ALU) and logic gates configured to support operation of processor 20.

Processor 20 may also include input/output (I/O) ports (or pins) coupled to input/output interface 21. Via configuration information (although FIG. 1A shows keypad module 28, display module 30, and mini USB module 32), the I/O may be configured to integrate any type of interface component (including, e.g., a multi-touch module, firewire module, etc.) and/or interface with any number of external devices such as, electronic security devices, merchandising displays, equipment tags, employee identification cards, alarms, speakers, piezo buzzers, microphones, lights (e.g., light emitting diodes (LEDs) including dual-color LEDs), buttons, keypads, monitors, displays (e.g., for changeable pricing labels), sensors (e.g., accelerometers, movement sensors (e.g., jiggle switch), light sensors, temperature sensors, cameras, camera controls, security gates, store audio systems, customer counters, lighting switches, employee communicators (e.g., headsets, handheld radios), door strike mats, jewelry case mats, Lojack® devices, global positioning system (GPS) devices, other barcode scanners, loyalty card scanners, other communications hardware (e.g., Ethernet hardware, RS232 hardware), and the like. As such, the I/O may be configured to support one or more functions that key device 10 may be configured to perform. For example, an I/O pin or port that is configured to interface with a light sensor may be used to determine whether a monitoring device's LED is illuminating properly and for the correct period of time. As another example, an I/O pin or port may interface with an LED to cause the LED to flash at a regular interval to provide a visual indication of the status of key device 10. For yet another example, an I/O pin or port may be configured to interface with a piezo buzzer to play various tones by processor 20. Further to the discussion above and according to various example embodiments, actuation of the movement switch and detection of the actuation by the I/O may be a trigger for key device 10 to transition from a sleep state to an awake state.

The memory device 44 may include, for example, one or more volatile and/or non-volatile memories. In other words, for example, the memory device 44 may be an electronic storage device (e.g., a computer-readable storage medium) comprising gates configured to store data (e.g., bits) that may be retrievable by a machine (e.g., a computing device including a processor such as processor 20). The memory device 44 may be configured to store information, data, applications, instructions or the like for enabling the key device 10 to carry out various functions in accordance with exemplary embodiments of the present invention. For example, the memory device 44 could be configured to buffer input data for processing by the processor 20. Additionally or alternatively, the memory device 44 could be configured to store instructions for execution by the processor 20.

As defined herein a "computer-readable storage medium" refers to a physical storage medium (e.g., volatile or non-volatile memory device) and can be differentiated from a "computer-readable transmission," which refers to an electromagnetic signal. Additionally, as used herein, the term "circuitry" refers to not only hardware-only circuit implementations including analog and/or digital circuitry, but at least also to combinations of circuits with corresponding software and/or instructions stored on a computer-readable storage medium.

The communication interface 22 may be any means such as a device or circuitry embodied in either hardware, software, or a combination of hardware and software that is configured to receive and/or transmit data from/to a network and/or any other device and/or module in communication with the key device 10. In this regard, the communication interface 22 may include, for example, an antenna (or multiple antennas 56, 58 and 60) and supporting hardware and/or software for enabling communications with a wireless communication network (not shown) or other devices, including configurable monitoring devices and/or passive RFID labels.

Additionally, to support network communications within the monitoring system (such as those discussed above and incorporated by reference), the communications interface 22 may support the implementation of a system-wide synchronized clock. Synchronization of the clock may be maintained via a clock signal. Key device 10 may include real time clock circuitry to support the synchronized clock and to regulate the use of precise communications windows.

In some exemplary embodiments, communication interface 22 may support communication via one or more different communication protocols or methods. In some embodiments, the communication interface 22 may be configured to support relatively low power, low data rate communication. As such, for example, a low power and short range communication radio (e.g., radio transmitter/receiver 46 and corresponding antenna 56) may be included in the communication interface 22. In some examples, the radio transmitter/receiver 46 may include a transmitter and corresponding receiver configured to support radio frequency (RF) communication in accordance with an IEEE (Institute of Electrical and Electronics Engineers) communication standard such as IEEE 802.11 and/or a cellular network. As such, for example, some embodiments may employ Bluetooth, Wibree, ultra-wideband (UWB), WirelessHART, MiWi or other communication standards employing relatively short range wireless communication in a network such as a wireless personal area network (WPAN). In some cases, IEEE 802.15.4 based communication techniques such as ZigBee or other low power, short range communication protocols such as a proprietary technique based on IEEE 802.15.4 may be employed using module 50 and antenna 60. For example, module 50 may support a Route Under MAC (Media Access Control) (RUM) protocol or a modified RUM protocol. As such, the communications interface 22 may be configured to utilize a one or more network identifiers, for example stored in the memory device 44, such as a personal area network (PAN) identifier. In some example embodiments, key device 10 might not be permitted to communicate within the monitoring system without using a matching network identifier. A description of some example embodiments of monitoring devices and the monitoring systems (including networks) that may support configurable monitoring devices, are provided in commonly-assigned U.S. Patent Application No. 61/244,320, filed Sep. 21, 2009, entitled "A Configurable Monitoring Device," and commonly assigned U.S. patent application Ser. No. 12/636,564, also filed Dec. 11, 2009, entitled "Systems, Methods, and Apparatuses for Managing Configurable Monitoring Devices," the content of which are hereby incorporated by reference in their entirety and are collectively referred to herein as "The Previous Applications."

In some embodiments, for enhanced security, the user may have to enter a code that may be received via keypad module 28. The code may be relatively simple, such as a predetermined number assigned to a particular user, or it may be more complicated, such as those utilizing public-key and/or private-key cryptography (an example of which is based on the use of prime numbers and is known as the RSA algorithm). According to some example embodiments, communications interface 22 may be configured to support an Internet Protocol version 6 (IPV6) stack.

As an added layer of security, key device 10 can also include physical security features to help guard against a hacker (which may or may not also be an employee) creating an electronic device that mimics the electronic security aspects of key device 10. For example, as shown in FIGS. 1B and 1C, one or more protrusions 64 can be integrated into the housing enclosure of key device 10. Between protrusions 64 and within the enclosure, a powerful magnet and/or other component can be located and arranged in specific orientation, thereby requiring protrusions 64 to be placed into corresponding receptacles of integrated in a monitoring device. After the monitoring device receives protrusions 64, key device 10 aligns its internal magnets (and/or other components that are not shown) accordingly with the monitoring device's security features (e.g., mechanical locking mechanism). Key device 10 may communicate with the monitoring device and/or provide the necessary electronic commands (some examples of which are discussed herein), and the monitoring device may be removed from the item being tracked and secured by the monitoring system. As such, some embodiments of key device 10 can provide multiple layers of security, physical, electrical and/or virtual, to items being monitored and secured by monitoring devices.

According to some example embodiments, key device 10 and/or other aspects of the monitoring system may select one or more communications channels to facilitate communications between key device 10 and the monitoring system. For example, a fixed channel scheme may be utilized. Key device 10 may, based on the noise and/or channel traffic, be configured to automatically select a quiet channel. However, a procedure may be implemented by the network's monitoring terminal and/or key device 10 that provides for changing channels, for example, when a channel begins to operate poorly. According to some example embodiments, the network's monitoring terminal may communicate to key device 10 to change channels, and/or the key device 10 may perform a channel scan to determine the new channel.

As indicated herein, the processor 20 of exemplary embodiments may be embodied as, include and/or otherwise control alarm module 26 of key device 10. Alarm module 26 may include any means, such as a device and/or circuitry operating in accordance with firmware/software or otherwise embodied in hardware or a combination of hardware and firmware/software (e.g., processor 20 operating under software control, the processor 20 embodied as an ASIC or FPGA specifically configured to perform the operations described herein, or a combination thereof).

Processor 20 can also be configured to control operation of key device 10 based on configuration information provided to key device 10 (e.g., via input/output interface 21 and/or communication interface 22) and/or pre-stored in the key device 10. According to some example embodiments, the configuration maintaining functionality of processor 20 may support a wireless bootloading. As such, for example, processor 20 may be configured to determine and/or control the configuration and thereby also the operation of key device 10 based on the current situation as determined by the stored configuration information, sensor output data (e.g., which may indicate key device 10's physical location), and/or based on the instructions received by key device 10 from the network.

The functionality of key device 10 may be simple or complex based on, for example, the rules and degree of security being implemented on enabling key device 10 to function to its fullest extent (e.g., commission tags, decommission tags, physically unlocking tags, change tag data, including prices, etc.). For example, key device 10 can issue unlocking and/or decommissioning command(s) to a monitoring device that is being used as, for example, a security and tracking tag, thereby allowing the item to be removed from the store without an alarm sounding. As another example, key device 10 can be configured to transmit and set the price for a product onto which the monitoring device is attached. Should key device 10 be accessed without authorization, a thief may set the price to a reduced amount and then go through a legitimate sales process for the item at the wrong price. In this regard, key device 10 may be configured to issue no commands to external devices unless authorization is granted based on a user-entered security code and/or a network device.

Figure 2:
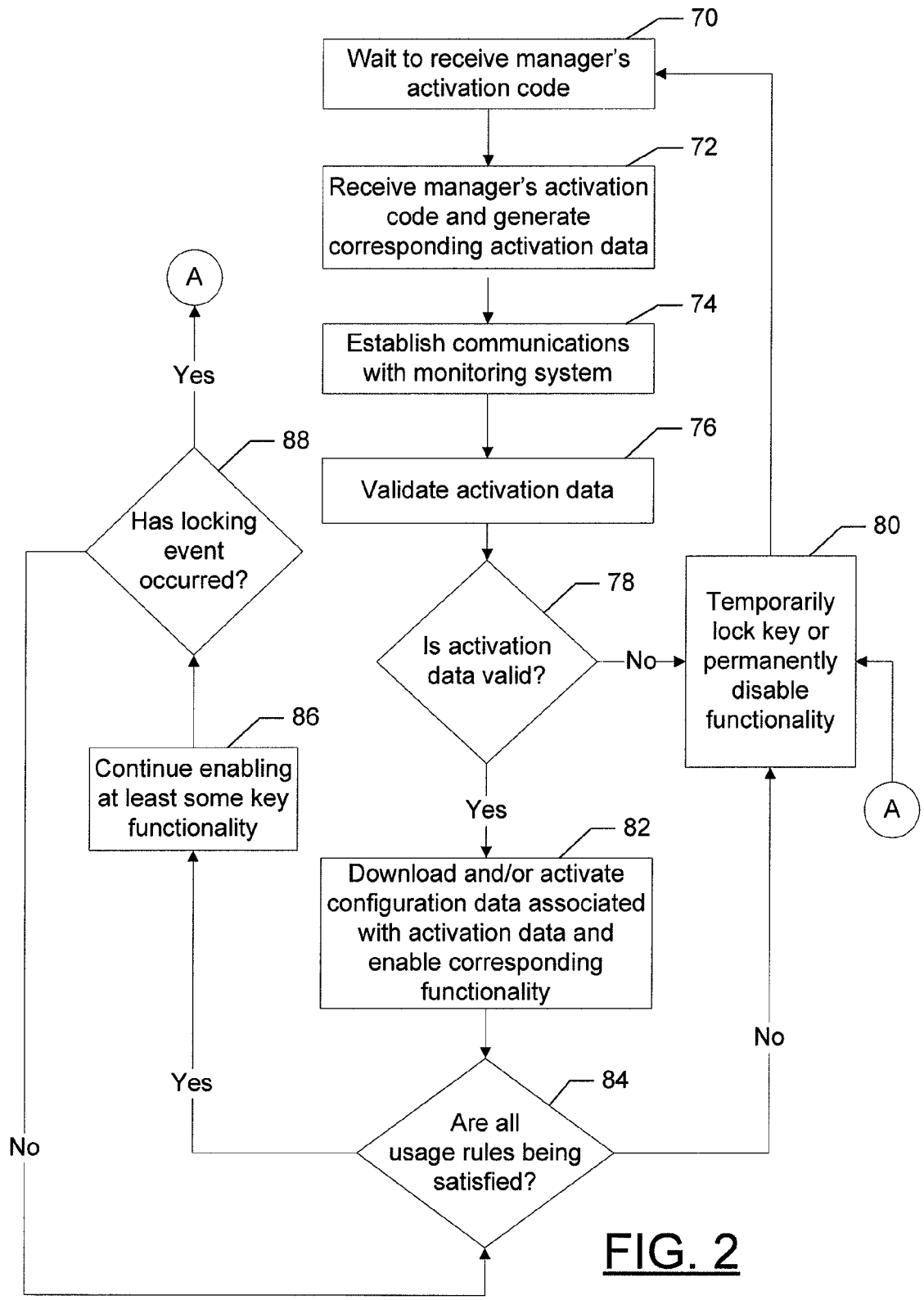
FIG. 2 shows an exemplary flow diagram of operations associated with key devices in accordance with some exemplary embodiments discussed herein.

FIG. 2 shows an exemplary method for how a key device in accordance with some embodiments, such as key device 10, may transition from sleep mode through initial configuration to the performance of an activity based on the configuration data provided. The method is represented by flow diagram in accordance with some exemplary methods, computer program products and/or systems discussed herein, including those discussed in reference to in FIGS. 1A-1C. It will be understood that each operation, action, step and/or other types of functions shown in the diagrams, and/or combinations of functions in the diagrams, can be implemented by various means. Means for implementing the functions of the flow diagrams, combinations of the actions in the diagrams, and/or other functionality of example embodiments of the present invention described herein may include hardware, and/or a computer program product including a computer-readable storage medium (as opposed to or in addition to a computer-readable transmission medium) having one or more computer program code instructions, program instructions, or executable computer-readable program code instructions stored therein. In this regard, program code instructions may be stored on a storage device of an example apparatus and executed by a processor, such as processor 20 discussed above. As will be appreciated, any such program code instructions may be loaded onto a computer or other programmable apparatus (e.g., processor 20, or the like) from a computer-readable storage medium (e.g., memory 44, or the like) to produce a particular machine, such that the particular machine becomes a means for implementing the functions specified in the diagrams' actions discussed in connection with, e.g., FIGS. 2-6D.

These program code instructions may also be stored in a computer-readable storage medium that can direct a computer, a processor (such as the processing circuitry discussed above), or other programmable apparatus to function in a particular manner to thereby generate a particular article of manufacture. The article of manufacture becomes a means for implementing the functions specified in the diagrams' actions discussed in connection with, e.g., FIGS. 2-6D. The program code instructions may be retrieved from a computer-readable storage medium and loaded into a computer, processor, or other programmable apparatus to configure the computer, processor, or other programmable apparatus to execute actions to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provides actions for implementing the functions specified in the actions discussed in connection with, e.g., FIGS. 2-6D.

After the key is powered ON, the key device can be configured to automatically enter a sleep or other type of quasi-dormant mode, in which the key device is unable to perform, for example, commissioning, decommissioning, silencing of system alarms, mechanical unlocking of monitoring devices and/or various other functionality. As such, the key device can wait for a manager's activation code at 70.

At 72, the key device can receive authentication data representing a manager's activation code. The authentication data can be, for example, entered (e.g., typed) in by a user, read from a memory device inserted into the key device, read from an accessory device (such as, e.g., a docking station, barcode reader, keychain fob, RFID security access card, among other things) that can be coupled with the key device. As yet another example, the authentication data can be received from another device (such as, e.g., a cellular phone, laptop computer, or second key device). In some embodiments, the authentication data can be obtained by a sensor (such as a biometric scanner) integrated or otherwise coupled to the key device, received by another means, or combination of the examples given herein. The key device can then generate at 72 activation data that corresponds to the physical, wireless, and/or other types of inputs the key device receives at 72. In some embodiments, the functions performed at 72 can be repeated multiple times, such as when multiple people, components and/or other authorization data sources are required to generate and/or compile the requisite authorization code.

In response to receiving the authentication data, the key device can establish a communications path with the monitoring system (via, e.g., a network) at 74. The activation data can then be provided over the communications path to the monitoring system. In other embodiments, the key device can also be configured to authenticate a manager's activation code in conjunction with or in the absence of the monitoring system. For example, the key device can be configured to authenticate a manager's activation code based on locally stored electronic security data by utilizing, e.g., the RSA algorithm and a synchronized RSA device, biometric scanning device (e.g., finger print scanner, optical scanner, etc.) and/or any other component or system proximate to or integrated within the key device. In some embodiments, the monitoring system may store one or more valid activation codes and, in response to receiving a code (e.g., over a secure communication's path) that matches a stored valid code, the monitoring system may transmit validation data indicating the activation code is valid. In response to receiving a code (e.g., over a secure communication's path) that fails to match one or more a stored valid codes, the monitoring system may send validation data indicates the activation code is invalid.

At 76, the key device and/or a network component of the monitoring system can collectively or individually validate the activation data based on, e.g., pre-stored security data and/or a dynamic security algorithm. If the activation data is determined to be invalid at 78, the key device can be locked until an event occurs at 80 (such as, e.g., the expiration of a predetermined period of time, which can be any duration such, e.g., seconds, minutes, hours or days). For example, the monitoring system may send a command that electrically and/or mechanically locks one or more components of the key device. Additionally or alternatively, locking of the key device may include the monitoring system blocking and/or at least temporarily disassociating permissions from the key device (such as, e.g., the ability to silence a sounding alarm, unlock a tag from an item, commission a tag, and/or decommission a tag). Despite being locked, there may be way for one or more users with higher access rights (such as a senior manager) to re-enable (at least some of) the functionality of the key device. One or more components of the monitoring system may be configured to store levels of access rights.

In some embodiments, such as when validation and activation is dependent on a number of conditions being met, which are subsequently not satisfied, some or all of the functionality of the key device can be permanently disabled. For example, if the wrong 4-digit code is entered a predetermined number of times (e.g., 5 times) within a predetermined period of time (e.g., a minute, an hour, a day, etc.) and/or while the key device is physically located outside of an authorized zone (such as in a retail store or mall), the key device can determine that it has likely been stolen and permanently disable it's commissioning, decommissioning, alarm silencing, unlocking and/or other functionality (by, e.g., permanently erasing all firmware from the key device's memory). Additional examples of conditions that may cause the key device to become temporarily locked and/or permanently disabled are discussed in connection with FIG. 4. In addition to permanently destroying some functionality, other functionality can be activated, such as a homing ping (using, e.g., Lojack®, etc.), cellular phone, or other locating component. In some embodiments, a permanently disabled key device may be restored by an authorized system manager and/or other user subsequent to recovering a stolen key device.

If the activation data is determined to be valid at 78, the key device can download and/or activate configuration data associated with the activation data at 82. During configuration, the key device can be provided with configuration information that defines the stimuli to which the node, tag and/or other monitoring system components are to respond and the corresponding manner of the response (e.g., based on the rules for each respective event or condition encountered). For example, different users may be given and/or otherwise be associated with different activation codes and/or other security credentials. In a retail environment, for example, a cashier's activation code can enable the cashier to use the key to decommission tags placed on, over and/or otherwise in proximity with the cash register area of a store (which may be determined by, e.g., the key device being close enough to one or more particular nodes, such as a cash register area positional node, to communicate with the particular node(s)), whereas a store manager's activation code can enable the (same) physical key device to unlock display cases containing, and/or tags securing, highly valuable, high-theft items. Similarly, while the configuration data downloaded to the key in response to the activation data entered by the store manager may allow the key device to be used anywhere in the particular store, a regional manager's activation code may allow the key to be used in all stores in one or more malls, or even anywhere in a geographic region (e.g., the southeastern United States).

Figure 3B:
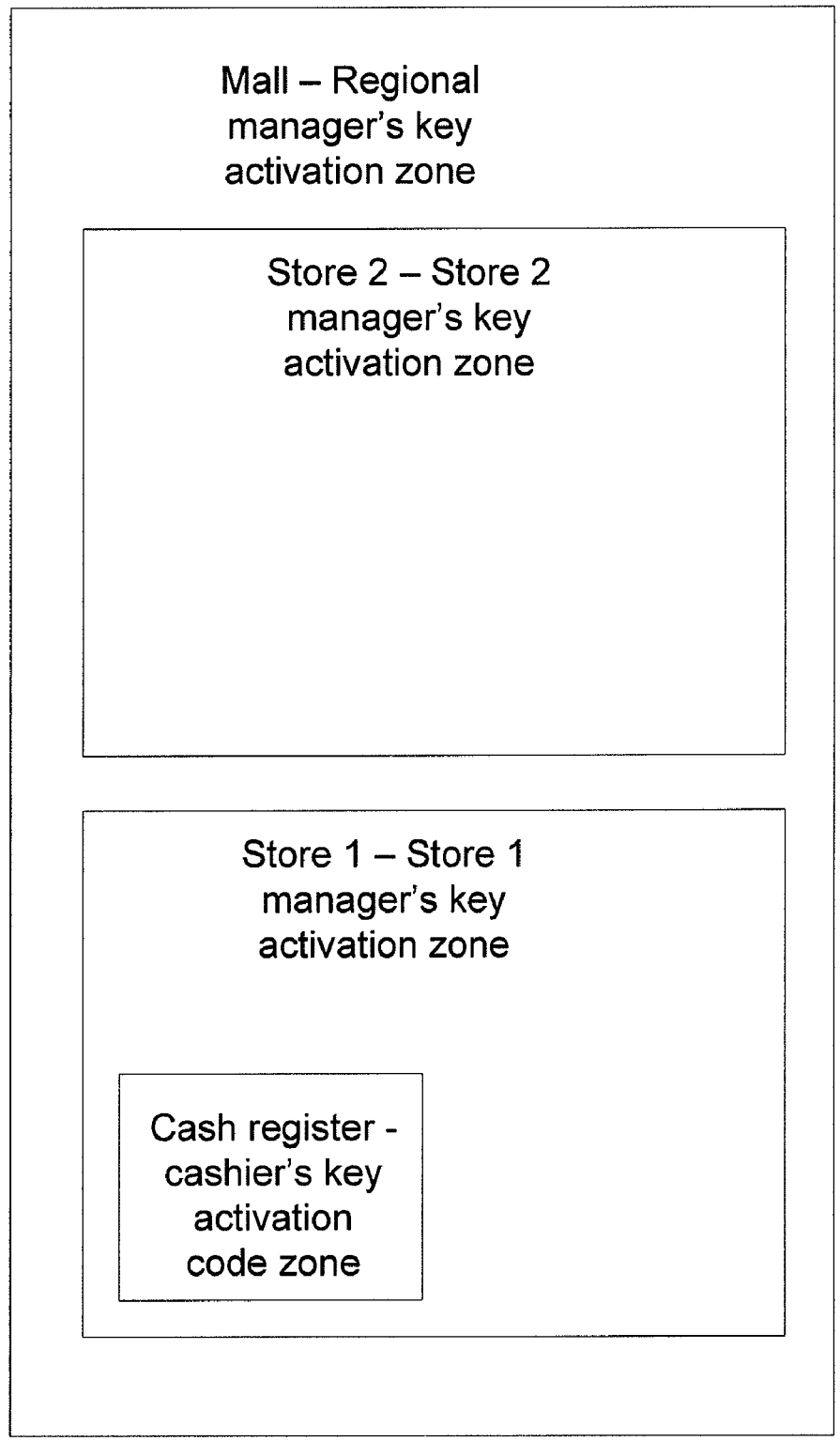
FIG. 3B shows a diagram of an exemplary retail mall configuration having multiple stores with regards to location-based rules for a key device in accordance with some exemplary embodiments discussed herein.

Accordingly, as shown in FIGS. 3A and 3B, the particular user (based on activation code and other credentials received at 72) can be at least one factor in determining the functionality of the key device. FIG. 3A shows an exemplary data structure of usage rules that may be associated with one or more levels of functionality in accordance with some embodiments discussed herein. The data structure of FIG. 3A may be stored at the key device (such as in memory 44), at a network entity (such as a monitoring system database), among a plurality of devices (e.g., at the key device and a network database), and/or any other device. Column 90 of FIG. 3A includes exemplary rules that may be implemented by a key device, such as key device 10, in accordance with some embodiments discussed herein. For example, receiving an activation code, the key device may be configured to generate activation data based on the activation code.

The activation data may be compared to activation data stored in the memory of the key device. The memory's activation data may be associated with one or more of columns 92, 94, 96, 98, 102, 104, 106 and/or 108. In response to determining the activation data is valid, configuration data that enables and/or disables various key device functionality may be implemented.

In some embodiments, the activation data may be compared to activation data stored remotely from the key device. The remotely stored activation data may be associated with one or more of columns 92, 94, 96, 98, 102, 104, 106 and/or 108. In response to receiving the activation data, the key device can be configured to transmit the activation data using a wireless transmitter (such as those included in communications interface 22) to transmit the activation data to one or more network entities (which may be, for example, in the retail store and/or other area). Each network entity may be configured to determine whether or not the activation data is valid and transmit validation data to the key device. The validation data may indicate whether the activation data is valid, invalid, incomplete, etc. In response to receiving validation data that authenticates the activation data, configuration data associated with the activation data may be activated. For example, if a very important person ("VIP") customer enters activation data, the key device may be configured to download and/or activate functionality associated with column 94.

Each type of user may have a code assigned thereto that is associated with a level of functionality. FIG. 3A shows some exemplary levels of functionality. FIG. 3A also shows in column 90 some exemplary functionality that may be enabled or disabled based upon the activation data received from a user. For example, all activated key devices may be able to request and/or receive product information (e.g., price, current location, availability, etc.), shopping advice (e.g., suggestions of complimentary items, upcoming sales, terms of use, return policy, etc.), and/or marketing information (e.g., commercials, promotional materials, etc.). As another example, all key devices, except those activated for a level 1 customer, may be able to unlock pre-designated devices to view and/or handle retail items. For example, a VIP customer may be a customer that spends a certain amount of money each year in the store and/or a customer who has provided personal information (e.g., driver's license information, credit card numbers, etc.) to the store. Because the store has a relationship and/or additional information about the VIP customer, as shown in column 94, a key that is activated by a VIP customer may have more functionality enabled by its configuration data than a key device being used by a level 1 customer as shown in column 92.

Similarly or alternatively, employees of the retail establishment may have varying levels of authority associated with their key devices. For example, location based rules may be applied to decommissioning a tag that is associated with a retail item as shown by columns 96 and 98. In some embodiments, employees of a particular store may only be able to decommission tags at the store where they work as shown in columns 96 and 98. In some embodiments, all employee key devices may be enabled to commission tags (e.g., associate product information with a tag) as shown in FIG. 3A.

The level of employee may also impact the functionality of a key device. For example, a docking station may be used to charge a plurality of key devices that may be the same and/or similar. Upon arriving at the retail establishment, each employee may select any key device and enter an activation code (using e.g., keypad module 28, barcode reader 62, an RFID antenna included in the key device, among other things). If a more senior employee, such as a store manager (as compared to a sales clerk), selects a key device and enters his activation code, the key device may be enabled to perform various operations that the key device may not be enabled to perform if a sales clerk or customer selected it from the docking station and entered an associated activation code. For example, as shown by columns 102 and 104, zone-based and/or department based rules within a retail store may prevent a sales clerk (preventing, e.g., the sales clerk from decommissioning tags in the restroom and/or various departments), but not a store manager. As another example, a store manager's key device (e.g., a key device that has been configured based on data associated with a store manager's activation code) may be configured to unlock a tote upon receiving the proper tote code (discussed below), whereas a sales' clerk's key device may not be able to unlock a tote even after receiving the correct tote code.

A regional manager, as shown by column 106, may be able to use a key device with less restrictions, as may an executive shown by column 108. In other embodiments, such as those associated with the pharmacists, a traveling pharmacist may use his key in many drug stores, while a non-traveling pharmacist and/or cashier may only be able to use their key devices within their assigned store. FIG. 3B shows a diagram of an exemplary retail mall configuration having multiple stores with regards to location-based rules for a key device in accordance with some exemplary embodiments discussed herein. As shown in FIG. 3B, the regional manager's key device may be configured to function anywhere within the mall, while the each store manager's key device may be enabled to only function within its respective store. In this regard, the key devices are less likely to be stolen and, if they are, likely to be rendered useless.

In some embodiments, although not shown in FIG. 3A, an executive's key device may have different permissions than a level 5 user's key device. For example, only pharmacists' keys may be configured to unlock pill cabinets.

Additionally or alternatively, key devices can be configured to unlock certain products (such as high value products) only when a particular user's key device (such as store manager's key) is used. In addition, some tags (which may be monitoring particularly valuable and/or high theft items) may only be decommissioned and/or unlocked by specific and/or multiple key devices with the proper authority. A log of product tags commissioned, decommissioned, alarming and/or unlocked can also be created and stored by the key device locally and/or the monitoring system remotely (from the key device).

Returning to FIG. 2, in some embodiments, the functions performed at 82 can be executed locally by the key device in the absence of or in connection with a network monitoring system. For example, the configuration data, such as the data shown in data structure of FIG. 3A, can be stored (encrypted or otherwise) on the key device and/or only accessed after valid activation data has been generated that is associated with one of columns 90, 92, 94, 96, 98 102, 104, 106 or 108.

Subsequent to validating activation data, downloading and/or activating configuration data, a determination of continued compliance with the configuration data can be periodically made (e.g., every few seconds, few minutes or hours) at 84. Periodically checking for continued compliance at 84 can save battery power, as compared to constantly checking for compliance. For example, the configuration data can require that the key device confirm every minute that the key device is being used in an authorized manner in an approved physical location. In response to the key device determining that any or a certain number/type of the configuration data's usage rules are being violated and/or have been violated since the last check of key usage rule violations, the key device may execute the functions at 80 and be temporarily locked or permanently disabled. The key device may also or instead notify the monitoring system of rule violation (such as being taken outside of a permitted boundary). In some embodiments, the key device can be configured to constantly or repeatedly check (e.g., every fraction of a second or every second) for continued compliance and/or check in response receiving a signal (from, e.g., a motion detecting component included in key device 10).

Additionally, the key device can be configured to receive data (such as an alarm signal) pushed down from a network terminal that indicates noncompliance with the usage rules currently being implemented by the configuration data. For example, and in reference to FIG. 4, a sensor or other external device may send a signal to the key device that causes the key device to perform processing, perform functionality, or enable functionality. As an example, if a tag's alarm is malfunctioning, the monitoring system can push a signal to the key device, which can then alert the user (e.g., retail store manager) of the faulty tag. As another example, when a tag is alerting, the monitoring system may push a tag alert signal to the key device indicating the tag that is alarming. The user may be able to use a button, such as button 66 shown in FIG. 1B, on the key device to remotely silence the alarm. The key device may also be configured to find the alerting tag using any type of locationing protocol, such as those discussed in U.S. patent application Ser. Nos. 12/636,564, 12/628,863 and 12/887,228, which were previously incorporated by reference in their entirety.

Similarly, should the unauthorized removal of a tag, node and/or other type of device from a retail store be detected, other tags or external sensors or devices (e.g., camera information, photo eye information, instructions from the monitoring terminal 190, and/or the like) can provide information (e.g., via automatic streaming) to the key device, which may be configured to present a display on the display screen (e.g., display 30). The conditions encountered may be compared to a security rule set within the configuration data and used to determine whether the conditions necessitate the execution of any actions by the key device. As discussed further below in connection with, e.g., FIGS. 3 and 4, the rules may include location based, time based, and/or identity based rules, some examples of which are given herein. If conditions are such that a particular rule is triggered (or multiple rules are triggered), a corresponding action may be taken by the key device. The actions may include initiating a tracking operation, initiating continued monitoring (rather than periodic monitoring), initiating a report, initiating an alarm locally and/or remotely, disabling (e.g., silencing) an alarm locally and/or remotely, directing logging/storing of data (including, e.g., alarm data), directing movement or operation of a camera, directing provision of information, and/or the like.

In response to the key device determining that there have not been any or enough rule violations to exceed a predetermined threshold (such as one, two or more rule violations), the process returns to operation 86. A determination to proceed to execute operation 86 can be made even if there are minor infractions or merely suspicious behavior detected. For example, the key device may be configured to determine that suspicious activity has occurred after a cashier uses the key device to decommission a predetermined number (e.g., twenty) of the same type of item (e.g., shirt) within a given period of time (e.g., two minutes). In some embodiments, the key device may be configured to lock after detecting such suspicious activity to prevent possible employee theft. In other embodiments, the cashier's key device may continue to operate (as to not disrupt the flow of legitimate sales), and/or the suspicious activity can be logged and a manager and/or other user automatically notified by the monitoring system. As such, the benefit of the doubt can be given to the employee without potentially slowing down legitimate sales, though the events can be logged if a theft is later discovered while also notifying the manager and/or security of the suspicious events.

At 86, the key device continues to function consistent with the configuration data, though some functionality could be restricted if suspicious activities are detected. For example, while a cashier may be able to continue using the cashier key device to purchase relatively low cost items, a manager's key device (e.g., a key device that has be configured to be used by a retail store manager) may be required to purchase a high cost item, even if the cashier could have conducted the purchase had there been no suspicious activities detected.

At 88, the key device can be configured to determine whether a locking event occurred. A locking event can cause the key device to temporarily disable key functionality and, in some embodiments, may be different than a rule violation (such as those discussed above). The functions at 80 may be executed and in response to determining that a locking event has occurred. The functions at 84 may be executed and in response to determining that a locking event has not occurred at 88. Examples of locking events include exceeding allotted time period of inactivity, battery power draining too low, exiting of authorized physical location (which can be differentiated from leaving the authorized physical location and subsequently receiving invalid access data), and/or other events that may pose a security risk but not a security threat. In some embodiments, a locking event may cause a local locking of the key device (such as a key lock) as opposed to requiring the entire activation process to be executed again. There may also be levels of locking events. For example, 1 minute of inactivity may cause a key lock to be implemented, while an hour of inactivity may cause erasure of configuration data. The levels can be user configurable and/or also integrated into the configuration data.

Figure 4:
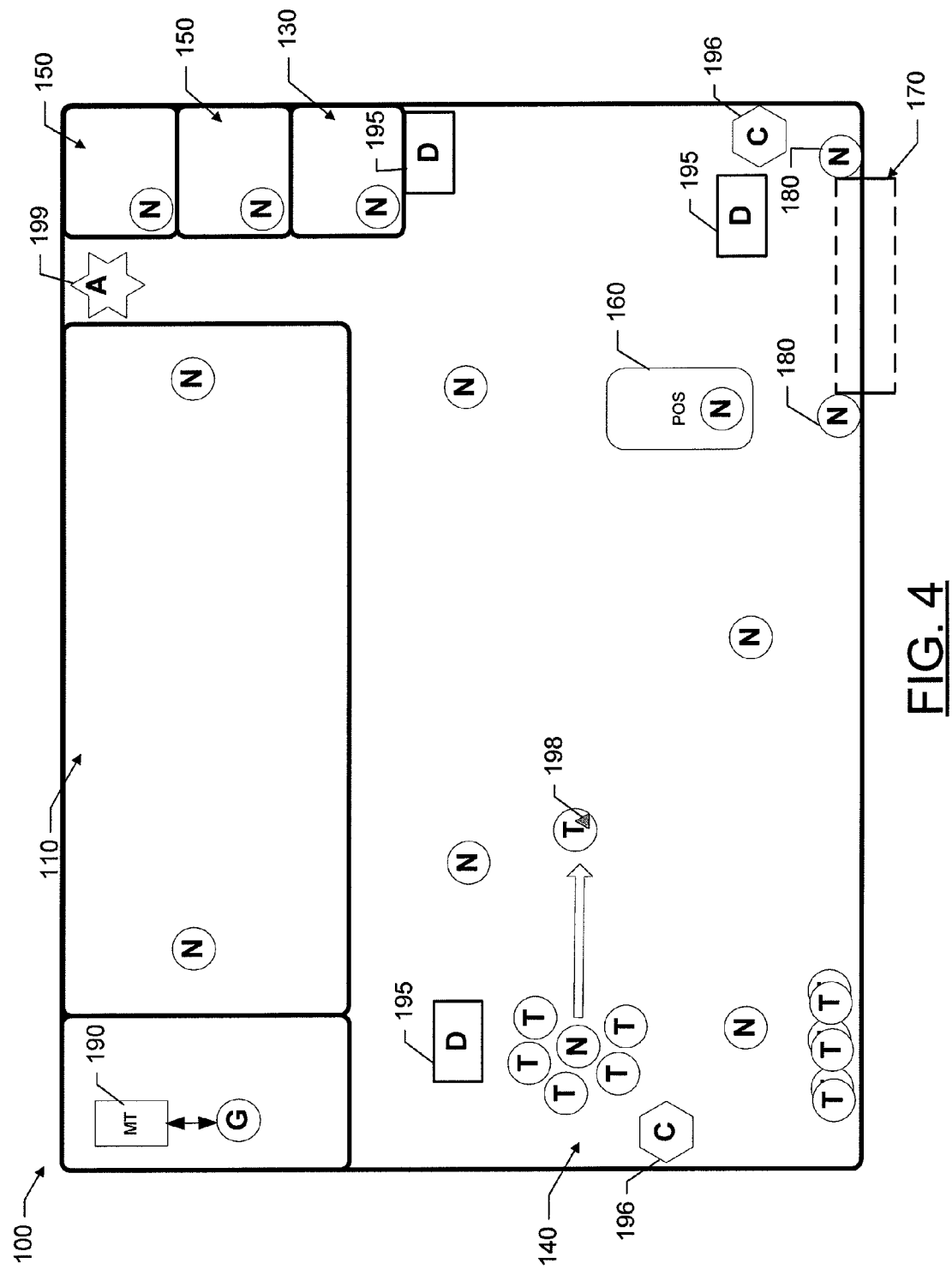
FIG. 4 shows a retail store with regards to location-based rules for a key device in accordance with some exemplary embodiments discussed herein.

Further to the discussion above, a particular area, such as a retail store, can be divided into various zones in which different configuration data may cause keys to function differently. FIG. 4 shows such an example involving a common retail store layout. Within a retail environment application, various different products may each be provided with a corresponding monitoring device operating as a tag. Furthermore, several other types of monitoring devices, all of which may be networked together wirelessly, may be provided at various locations throughout the retail environment to operate, for example, as nodes. In this regard, the location of a node within the retail environment may be known (e.g., coordinates of the nodes may be known) to, for example, the monitoring terminal 190 to facilitate implementation of a real-time location system (RTLS) for the tags via the nodes.

Several tags, which may include monitoring devices operating in a tag mode, are shown in FIG. 4 as circles with the letter "T" therein. Some other monitoring system components, which may include configurable monitoring devices configured during commissioning to operate in a node mode, operating in node mode are shown in FIG. 4 as circles with the letter "N" therein. An example of a monitoring system component, which may include a configurable monitoring device operating in a gateway mode, is shown in FIG. 4 as a circle with the letter "G" therein. The circles with the letter "C" may be a monitoring system component configured to operate with customer countering devices (e.g., strike pads, and the like). The circles with the letter "D" may be monitoring system components configured to operate with door opening monitoring devices configured to determine and report a number of times customers open, for example, a freezer door in grocery frozen food section. The circle with the letter "P" may be monitoring system components configured to operate with a camera to capture audio, digital photographs and/or video when an event, such as the alarming of a tag has occurred. The monitoring system may interface with its camera-enabled components and be configured to control the movement and/or field of view of the camera(s). The monitoring system may also forward video or pictures taken by the camera(s) to key device 10. Additionally or alternatively, other components of the monitoring system may be configured to operate as gate(s), hub(s) and/or gateway. While configurable and/or other types of monitoring devices may be configured as tags, nodes, gateways, etc., each of these roles may be further refined, for example via configuration information, to specialize the functionality of a configurable monitoring device within a particular role.

A network-based monitoring terminal 190 may be configured to consider the location information of a key device with respect to defined usage rules, alarm conditions, and alarm responses. In this regard, zones of interest within a retail environment may be defined, and when the monitoring terminal 190 determines that a key device has entered a zone of interest, corresponding security, monitoring and/or other functionality may be implemented. If a security function is to be implemented, for example, an alarm may be triggered and/or real-time tracking may be initiated. However, other different functionalities could alternatively or additionally be triggered.

In general and further to the discussion above, conditions may be actively or passively monitored (e.g., by the monitoring terminal 190 and/or each key device (10) logging (e.g., periodically storing) or analyzing data in real-time). In some embodiments, the conditions may be compared to a set of rules (such as those discussed above) to determine whether to initiate a functionality prescribed for a particular rule. The rules may be integrated into the key's configuration data, and may be specified for employment in accordance with exemplary embodiments of the present invention and may be categorized, for example, as location or zone based rules, time based rules, or identity based rules. However, other rules may also be provided. Zone based rules, like those briefly described above, may prescribe a particular action based on the location in which the tag is currently situated. Time based rules may operate differently based on the time of day and/or an elapsed period of time (e.g., key device 10 may be allowed in a fitting room for a predetermined period of time). For example, certain functionality may be active at certain times of the day, but disabled at other times of the day. Alternatively, functionality may be active, but different, dependent upon the time of day.

Identity based rules may include rules defining functionality associated with the identity of the person or product associated with a specific event. In this regard, for example, some embodiments may provide personal identification tags (such as RFID circuits and/or other types of identifying tags) to be worn by or carried by specific personnel, including employees and customers. For example, an employee's communication headset may include an identification tag. As another example, a customer's credit card may include an identification tag (e.g., RFID transponder, magnetic strip, etc.). The identification tag may comprise the person's activation code(s). Each identification tag may be directly associated with a corresponding employee or customer and rules for access, presentation content or other functionality may be prescribed accordingly. For example, if a customer has access to and is using a key device, the key device may only act as price check device. Alternatively or additionally, since each monitoring device may be associated uniquely with a corresponding product, specific rules for certain products may be defined in each key device's configuration data. Furthermore, combinations of identity based rules, time based rules location or zone based rules and/or any other type of rules may also be applied. Thus, for example, rules may define that certain individuals or certain products may only be allowed in certain zones at one or predetermined times. Any exceptions to the rules may result in an alarm condition that can be logged and/or announced (using, e.g., a message, an audible alert, a visual alert, among other things).

FIG. 4 shows an exemplary retail space that has been divided into various specific rooms and other types of monitored spaces by the monitoring system. Each room and monitored space can be designated as a zone of interest with, for example, corresponding monitoring and/or security functions associated therewith. As an example, store personnel may wish to define an alarm condition when a key device 10 enters the restroom area 150 of FIG. 4. As such, a zone of interest may be defined for the restroom area 150. Accordingly, when the monitoring terminal 190 determines that a key device (that may be activated and/or deactivated) has entered the restroom area, an alarm signal, message, data entry and/or other type of announcement may be generated, and a corresponding alarm response may be implemented (including, e.g., sounding an alarm at one or more the key devices, logging an alarm event in a network database, emailing a more senior employee, etc.). The alarm signal or message may also be sent to the key device, and an alarm on the key device may be activated. Further, zones of interest may be defined with respect a variety of areas within the retail environment (e.g., the stock room, point of sale, fitting room, etc.).

A zone of interest may also be associated with additional parameters, such as a time interval. For example, an employee may be permitted to bring a key device into fitting room 130. However, after exceeding threshold duration of time, a reminder may be issued to store personnel to remove the key device from fitting room 130 and/or an announcement (via email, text message, loud speaker, etc.) may be made that can be received by one or more other employees. Store management personnel may, for example, wish to set a one minute duration for a timer associated with fitting room 130. Accordingly, monitoring terminal 190 may be configured to define a duration of time, such as one or more minutes, for a zone of interest. Monitoring terminal 190 may be configured to implement a timer based on the threshold duration. The timer may continue to run while the key device is located within the zone of interest and, when the time reaches the threshold, an alarm signal or message may be generated and transmitted by monitoring terminal 190 to one or more other employees' key device(s). If monitoring terminal 190 determines that the key device has exited the zone of interest, monitoring terminal 190 may be configured to reset the timer. Additionally, the location of the key device (e.g., in the fitting room) may also be information received to enable condition determination. For example, the cashier may only be allowed to take their key device, in an enable mode, into the restroom for no more than 2 minutes. Thereafter, the security rules may be applied at operation 80 and a corresponding action may be taken (e.g., to notify a manager's key device having a higher authorization level, etc.).

Locating a key device may also allow one or more other key devices to track the movement of the first key device and the associated product through the store. Tracking the movement of one or more specific key devices may provide inventory, security, among other things. Based on the location information determined for a key device, the movement of the key device may be tracked by the monitoring terminal 190 and a movement profile may be generated and compared to suspicious activity movement profiles. If a match is identified, a notification may be provided to a manager, security guard, or the like via their key device to investigate the situation.

Further, according to some example embodiments, the key device can instruct monitoring terminal 190 to activate other tags, or activate other tags on nearby devices to alarm when, for example, a shoplifter is detected. Adjacent tags could provide an alarming pattern that "follows" a would-be shoplifter around or through the retail environment. Once the potential shoplifter is found, the key device can be used to silence the alarming tags as to quickly end any unpleasant disruption to innocent shoppers.

In some embodiments, the monitoring terminal 190 may be configured to analyze staffing statistics relative to loss statistics in order to provide optimal staffing suggestions to reduce product loss. This information can be relayed and presented by the key device to the appropriate managers and/or other users. In this regard, for example, in situations where employees carry tags (e.g., in a communication headset or other device), data regarding employee location could be compared to loss data to determine which staffing assignments tend to result in lower loss rates. In addition, the key device can be configured to display the current location of each employ in real time, such as when an alarm is sounding. The monitoring system may therefore be enabled to analyze loss and staffing data, as well as direct staff to a would-be shoplifter, to provide an indication of best practices or of other process improvement strategies.

The monitoring system may also be employed to provide an interactive shopping experience for shoppers based on the information above or on other information. The interactive experience may also have theft deterrent side benefits. In this regard, for example, the monitoring terminal 190 may be configured to interface with a key device any where in the retail location to provide marketing suggestions while supporting security functionality.

In a similar application involving customer information terminals, tags entering a store may be considered. For example, if the monitoring terminal 190 determines that a tag has entered the store through the front entrance, the monitoring terminal 190 may be configured to cause a key device to present either visually and/or audibly that a customer is likely headed to the service desk for product returns.

Accordingly, various different rules could be defined based on the configuration data to control a key device's behavior under various different circumstances that may be encountered. In this regard, the monitoring terminal 190 and/or key device 10 may have a rules table defining various actions corresponding to respective encountered stimuli for each user's configuration data. The user's configuration data can also be stored as a user's key profile on monitoring terminal 190 and/or key device 10. Moreover, the rules table may be segregated according to zone or location so that zone specific rules may differ in some circumstances. The rules may be defined as Boolean expressions to enable the monitoring terminal 190 and/or key device 10 to apply the rules in predefined cases where system components and/or sensors provide inputs used to determine whether a particular rule is triggered. In some embodiments, the sensors and/or other components may entirely or partially be associated with the key device, tags and/or other devices of monitoring system 100. However, in other embodiments, one or more other sensors, including conventional sensors, may be integrated with the monitoring system 100 to provide inputs for comparison to the rules of the rules table(s) to determine whether any particular rule is to be triggered. The sensors may include clocks or light sensors to determine time of day, photo eye sensors to determine whether a key device is being concealed, movement sensors as described above, cameras, security gate sensors (and/or firmware), and/or other sensory devices.

Further to the discussion above, in addition to location specific rules, time specific rules may also be applied so that, for example, particular activities with respect to key devices during nighttime hours are questioned or cause an alarm response when the same activities during working hours would initiate another or no alarm response. For example, using a key device to decommission a tag during working hours may not cause an alarm condition. However, after working hours, decommissioning a tag may trigger an alarm to a remote security team and/or store manager, since no tags should be decommissioned after business hours (unless an exception has been properly crated for, e.g., returning of excess stock items).

When a tag is an alarm mode, the key device may also enter an alarm mode. For example, the key device may be configured to emit an audible chip every second (or other predetermined time period) to notify the user of an alarm situation occurring elsewhere in the store.

Numerous other alarm modes and rules for tracking, alarming, monitoring and/or otherwise reacting to the environment may also be programmed into the key device based on the configuration data loaded onto each such device. Furthermore, the alarm functions may be initiated locally and/or remotely in some embodiments. For example, the alarm of the monitoring device may be triggered, while a key device may receive an alarm indication, despite the tag device not necessarily providing any local audible alarm. The alarm of the key device may emit a noise, light or other output in some examples. However, in alternative embodiments, the store, mall and/or other type of alarm system (e.g., alarm 199) may be triggered. In some embodiments, a call may be made to a law enforcement facility and/or a message may be sent to request dispatch of police or other security personnel to the scene. Information about the movement of tags and/or key devices, video and other data may then be recorded and perhaps transferred to law enforcement personnel, in response to a command generated by a key device having proper authority, to facilitate investigation and/or prosecution of crimes.

Since many retail environments may be noisy, in some embodiments the key device can be configured to issue a command to monitoring terminal 190 to reduce the volume of in-store music when, e.g., an alarming tag is detected. This may be done automatically based on the configuration data and/or in response to a manual user input into the key device. As such, the monitoring terminal 190, in response to receiving a command generated and transmitted by a key device, may reduce the volume of in-store music. Additionally or alternatively, some tags may be configured to alarm when they are within communication range of another alarming tag. Accordingly, for example, a tag that is alarming, but is concealed in some manner by the individual attempting to steal the corresponding product may set off a cascade of alarming tags and/or key device(s) in the vicinity of the alarming tag so that a thief's ability to silence one tag will be thwarted. Such behaviors of the tags, key devices and/or the monitoring terminal 190 may be controlled by the security rules that are applicable to any given situation and may be silenced collectively or individually based on a command generated by a key device.

In some embodiments, the key device may be enabled to provide a display showing locations of various tags at any give time. For example, display 30 (shown in FIG. 1B) may show nodes with respect to their physical location on a floor plan of the retail floor 140 (similar to FIG. 4) and show a corresponding number of tags associated with each node. Movement of a tag from one node to another node may be indicated by the movement of a symbol or icon from one node to the other and/or the decrementing of the number of tags at the node from which the tag departed, and incrementing of the number of tags at the node to which the tag has moved. All movements may be buffered or otherwise recorded for analysis locally at the key device and/or remotely by monitoring terminal 190. Each node may be accessed via the graphical user interface presented by display 30 of the key device to retrieve information about the product associated therewith, battery level and other information.

In an exemplary embodiment, rules may be applied to the movement of key devices. For example, if certain key devices are moved out of a specific location without being deactivated prior to movement, a local or remote alarm (e.g., accompanied with a corresponding message at the monitoring terminal 190) may be triggered to alert store personnel via one or more other key devices, or to initiate tracking of the key device and/or surveillance of the individual possessing the tag (e.g., with cameras or store personnel). Such surveillance can be coordinated using the one or more other key devices. Alternatively or additionally, if a threshold number of key devices from a given area move at the same time, an alarm may be triggered. In this regard, a large migration of key devices at one time may be indicative of a suspicious event, where a thief (or thieves) attempts to steal a large amount of key devices at one time. As indicated above, movement profiles may also be analyzed by a key device and rules for initiation of alarm conditions, real-time tracking, or other activities may be applied based on a comparison of a current movement profile to pre-stored suspicious movement profiles.

The following provides an example procedure for using a key device to bind, commission, decommission and unlock (unbind) a monitoring device that is configured as a tag. When the monitoring device is manufactured, the monitoring device may be provided configuration information to configure the monitoring device as a tag. The tag may initially be decommissioned and placed in an inactive state upon leaving the manufacturer. In the inactive state the tag may be configured to sleep indefinitely. However, if an unlock event occurs, such as the opening of a cable lock security device, the tag may awaken and be prepared for commissioning. In some embodiments, a tag may awaken in response to a locking event occurring (such as, e.g., a lanyard being inserted into a lock).

When the tag awakens, the tag may provide feedback to a user and the key device in the form of, for example, a beep noise. The tag may be configured to return to an inactive state in the event that movement of the tag (e.g., as indicated by a jiggle switch) is not detected for a period of time. For example, after five minutes of no detected movement, the tag may return to the inactive state. If motion commences or continues, the tag may be placed in the awake state and a fast LED blink may be provided as an indicator of the awake state. In the awake state, the tag may be configured to receive signals or listen to a communications channel designated for commissioning tags by a key device. A key device may transmit signals on the commissioning channel. In this regard, the key device may be a monitoring device (e.g., node) configured to transmit a low power commissioning query every 100 ms. The tag may be configured to return to the inactive (or sleep) state, if the tag fails to receive a commissioning query within 500 ms. In some example embodiments, a commissioning query may be accepted by the tag only if the key device provides a signal that reaches the tag having a signal strength greater than 90 percent of the level set for proper signal reception.

During the commissioning process, the user may hold the key device in close proximity (e.g., physically touching or within 6 inches) of the tag. Upon a button or other user interface sending processor 20 a signal, the key device may provide the tag a Tag ID, a Network ID, a communications channel, and the like. The key device may also read a traditional barcode SKU of the article to which the tag is or will be affixed, generate SKU data, and upload the SKU data to the tag in the same or separate process.

An anti-tamper mechanism may also be armed using the mechanical and/or electromechanical features of the key device's enclosure and internal components (such as powerful magnets). In this regard, in some situations, the key device may be a specially formed device, such as protrusions 64 (of FIGS. 1A and 1B) that mates mechanically with some portion of the tag (and/or the tag's mounting device) to disable a locking mechanism of the tag. The key device may include a magnetic device configured to interface with a locking mechanism of the tag to enable the tag to be bound or unlocked to permit the tag's removal from the corresponding item (e.g., product) to which the tag is affixed. According to some exemplary embodiments, the key device can be designed and configured to facilitate the binding of all kinds or a particular type or types of tags to various items. For example, a tag may utilize a pin-based mounting device (for protecting an item of clothing), a keeper or plastic enclosure (for protecting compact disks, software, cologne, and the like), a Spider Wrap™ or wire wrap device (for protecting larger boxed products), or the like. As another example, a key device may be configured to bind a tag to the shaft of a golf club or similar article such as the device disclosed in U.S. Pat. No. 7,266,979 herein incorporated by reference in its entirety. Other such tags may be attached to a bottle neck or a bottle cap such as the devices disclosed in U.S. Pat. Nos. 7,259,674 and 7,007,523, both herein incorporated by reference in their entirety. Still other mounting devices may be configured to attach through a product such as an article of clothing or a blister pack such as the hard-tag disclosed in U.S. Pat. No. 6,920,769 incorporated herein by reference in its entirety. Each of the aforementioned patents being commonly owned by the assignee of the present application.

As mentioned above, Alpha Security Products' Spider Wrap™, which is disclosed in U.S. Pat. No. 7,162,899 and herein incorporated by reference in its entirety, may also be configured to operate as a mounting device. Further, a cable lock, such as the Alpha Security Products' Cablelok™ device disclosed in U.S. Pat. No. 7,249,401 or a keeper, such as that disclosed in U.S. Pat. No. 6,832,498 may be a mounting device. Each of the aforementioned patents being commonly owned by the assignee of the present application and herein incorporated by reference in their entirety.

If the tag is not armed (electrically, mechanically, or both) within a threshold period of time (e.g., 5 seconds) after having been commissioned (e.g., associated with a SKU), the tag may provide a beep, a squawk and/or any other indicator (audile, visual and/or otherwise). Once the anti-tamper and security mechanism is armed, the key device may configure the tag to a seek and clock synchronization state, or the seek_sync state.

In the seek_sync state, the tag may be configured to seek out, and associate itself with a ping node and/or a communications node. The key device can also enable the tag to blink an LED to indicate an armed status and as a theft deterrent.

Having identified and interacted with at least one node, the tag may subsequently enter a seek_closest node state, where the tag determines the node (e.g., ping node) that the tag may associate itself with from a location perspective. In the seek_ closest state, the tag may blink an LED every 1 second, and scan a complete communications frame for the node providing the strongest signal and store a node ID, possibly taken from the signal, of the node. The key device may also configure the tag to store the node ID of the second strongest signal.

The key device can configure the tag to wake and transmit an inventory record at regular or irregular intervals, such as once an hour. The inventory record may be downloaded through the monitoring system to the key device, and include the ID of the tag, the current time, the period of active time for the tag, the tag's battery level, a handle count (indicating the number of times the article to which the tag is affixed has been handled), a time last handled, a current node ID, the time that the tag acquired the current node, and a previous node ID.

From the home state, the tag may enter a vigil state when motion is detected (e.g., via a motion detector component included in the tag) and the key device may be notified. Since the tag entered the vigil state because there is a potential of movement of the tag to a location closer to another node, the tag may be configured to scan and verify that signals received from the currently associated node remain stronger than signals being received from, for example, a node previously identified as having a second strongest signal strength. If the tag moves to a different location, the key device can be notified. The notification sent to the key device may not cause an audible sound or visual display, but instead may be saved locally on the key device. In this manner, if the user wants to, e.g., survey the location of the nodes in a retail space, the key device will be able to respond quicker than if the key device had to query the monitoring system and download the information.

Figure 5:
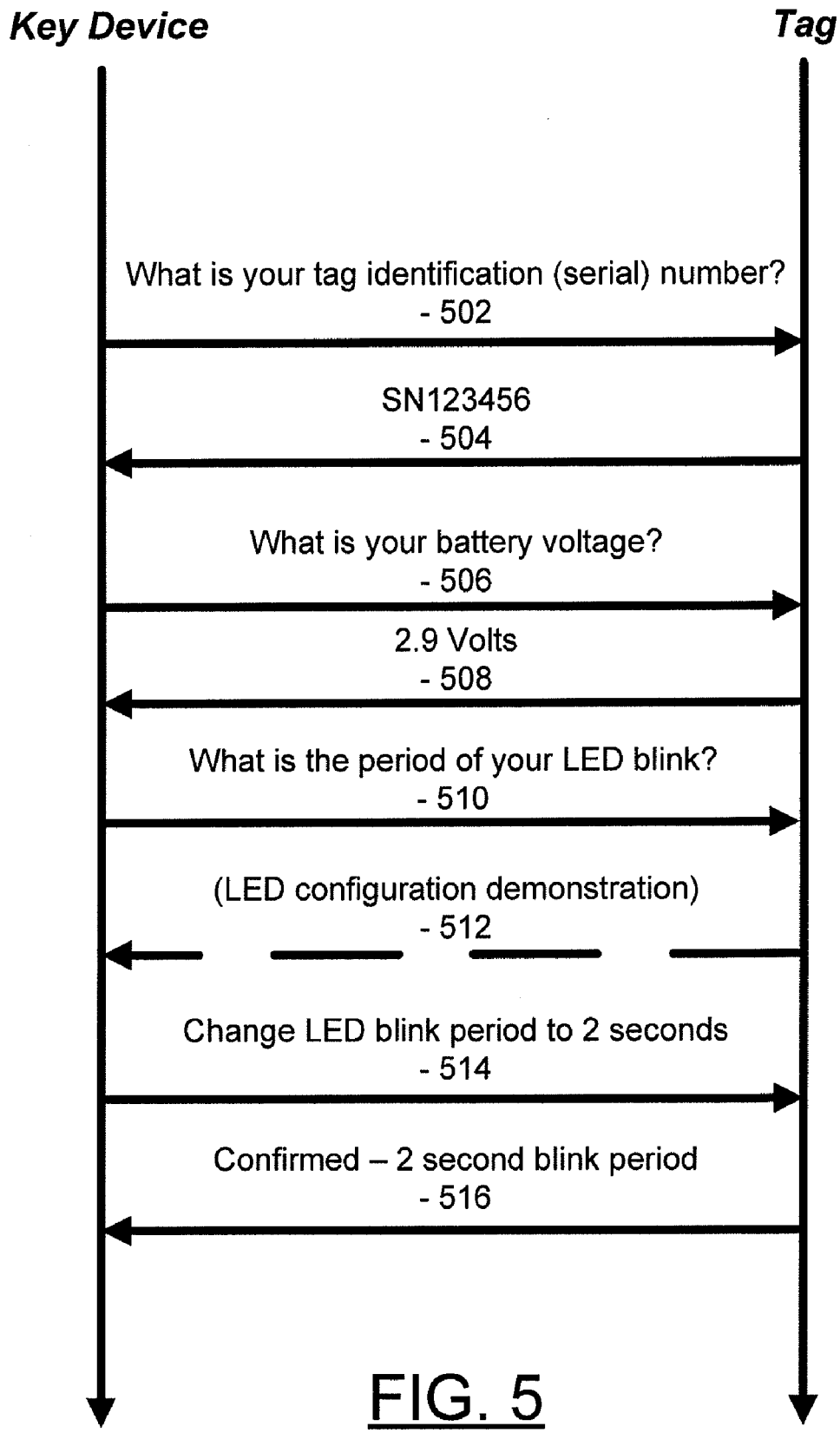
FIG. 5 shows a diagram that represents exemplary data flow between a key device and a monitoring device to update or reconfigure the monitoring device in accordance with some exemplary embodiments discussed herein.

While a tag is commissioned, a key device can be used to reconfigure various aspects of the tag's functionality. FIG. 5 shows an exemplary reconfiguration data exchange flow between a key device and tag. First, the key device can be placed in proximity to the tag the user would like to reconfigure. At 502, the key device can establish a communications path and interrogate the tag for its tag identification number. The tag identification number may include, for example, the tag's serial number assigned during the manufacturing process. In response, the tag can provide its identification number at 504. The key device can then inquire at 506 as to the tag's remaining battery voltage, and the tag can provide the requested information at 508. This exchange can be used by the key device to determine, for example, whether that tag has been properly reporting such information to the monitoring system. In embodiments where tags do not report such information to the monitoring system (on, e.g., an hourly basis or otherwise), the key device can then be used to upload the tag's remaining battery power to the monitoring system. The key device can additionally or instead interrogate the tag as to its blink illumination period at 510. In response, the tag can demonstrate its LED illumination to the key device at 512. The key device can generate and transmit a command to have the tag reconfigure the illumination period at 514. In response to receiving the command, the tag can confirm via a confirmation signal transmitted at 516 (and/or with another flash of the LED) that its configuration has been updated.

Further, to decommission a tag, for example at point of sale 160 of FIG. 4, a key device may generate a decommission signal, which is directed to the tag. The tag may subsequently provide an acknowledgment, and the tag may enter the inactive state. As mentioned above, a log can be created recording the time of decommissioning, the details of the product related to the decommissioned tag, the user profile associated with the decommissioning key device, among other things. In addition, during decommissioning, the key device can physically unlock the tag from the item.

If, for example, an alarm sounds during the decommissioning process due to, e.g., human error, a higher level key device (such as a more senior manager's key device as compared to a cashier's key device) can be used to override and silence one or more of the active alarms. The alarm overriding process may include depressing one or more buttons on the key device.

Figure 6A:
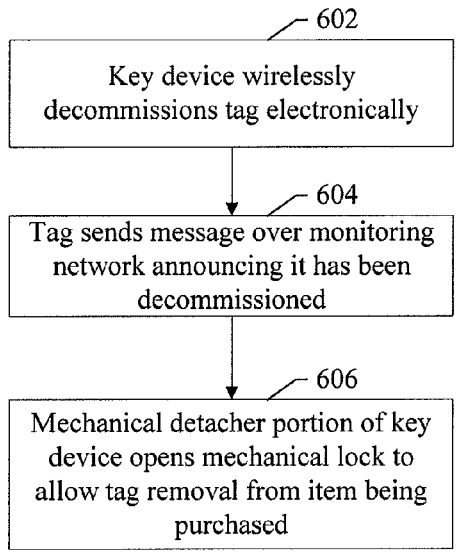
FIGS. 6A-6D show flow charts of various decommissioning processes that can be implemented using a key device in accordance with some exemplary embodiments discussed herein.

FIGS. 6A-6D show exemplary processes of decommissioning products at a point of sale. FIG. 6A shows a decommissioning process that utilizes the key device for both electronic deactivation and mechanical unlocking of the tag. At 602, the key device may wirelessly decommission the tag electronically. This may include deactivating the alarm and/or disassociating the tag with the item it is affixed to (including causing the tag to erase item-specific data from its memory). At 604, the tag may send a message over the monitoring network, announcing it has been decommissioned. At 606, the key device can open the mechanical and/or electromechanical lock of the tag, allowing the tag to be physically removed from the item.

Figure 6B:
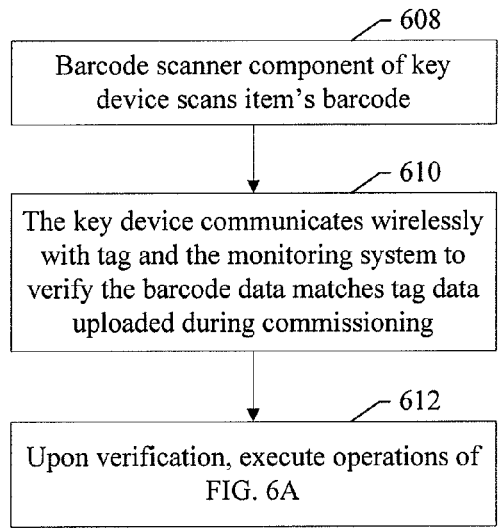

FIG. 6B builds on the process of FIG. 6A by including traditional barcode functionality. As discussed in connection with, e.g., FIG. 1, the key device can be configured to read barcodes or otherwise obtain data from a barcode reader through wireless and/or wired communications path(s), which is what the key device may do at 608. At 610, the key device may communicate wirelessly with the tag (to, e.g., obtain tag specific information, such as tag identification number) and with the monitoring system to verify that the barcode data matches the tag data uploaded to the monitoring system during the commissioning process. Upon verification at 612, operations associated with 602, 604 and 606 of FIG. 6a can be executed.

Figure 6C:
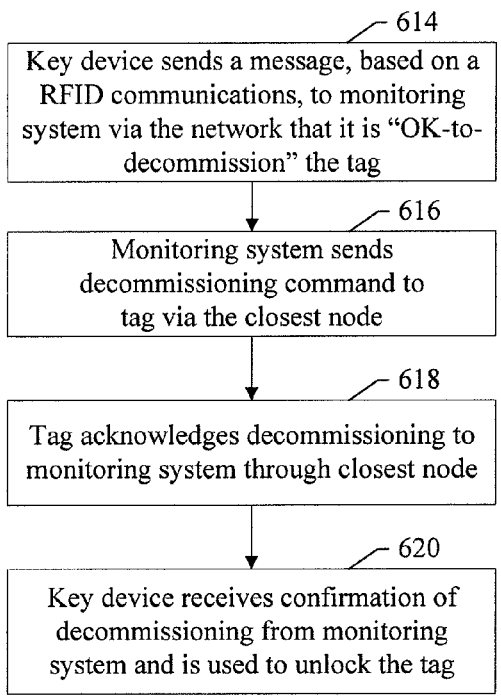

FIG. 6C utilizes the monitoring system to remotely decommission the tag that is proximate to the key device. The key device sends a message at 614 to the monitoring system via the network. The message indicates that the tag has been approved by the key device for decommissioning. The key device can identify the tag for decommissioning based on, for example, data extracted during RFID communications with the tag. The monitoring system can send a decommissioning command to the tag via the node closet to the tag at 616. At 618, the tag may be configured to acknowledge its decommissioning to the monitoring system through, e.g., the closest node(s) of the monitoring system. The key device receives confirmation of the tag's decommissioning from the monitoring system and the key device can be used to physically unlock the tag from the item at 620.

Figure 6D:
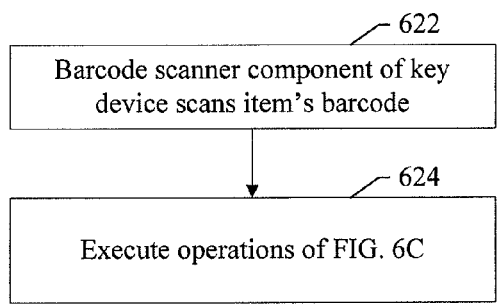

FIG. 6D builds on the process of FIG. 6C by utilizing the key device's visual barcode functionality. At 622, the key device reads the item's barcode. That information extracted from the barcode can then be used in conjunction with the operations discussed in connection with FIG. 6C.

The key may also report unlocking activities and/or other information regarding other devices encountered or activities undertaken to monitoring system manager, so that activity of the key (or persons possessing the key) may be monitored, logged, and/or tracked. Additionally, authenticity of the activation and/or other key codes may be defined and/or verified so that, for example, when a particular manager's key device is lost or a manager is no longer entitled to use the key device (e.g., the manager quits his job), the corresponding code for the manager's key device may be invalidated so that further unlocking operations with the manager's key device may not be possible. With respect to the security of the key device itself, the key device may be configured to alarm and/or destroy necessary aspects of the key device's functionality if the key device is, for example, improperly removed from the retail environment. For example, the key device may clear the memory of the key device, rendering the key device useless.

Utilization of the key device for unlocking security devices may be limited by rules stored on the key device and/or at a monitoring terminal. For example, rules for using the key device may be defined with respect to the location of the key (e.g., inside/outside the store, inside/outside a department zone), the employee using the key device (e.g., as indicated by a passcode or detection of a user's RFID tag), a time of day, a day of the week, a work schedule. Use of the key in violation of the rules may cause the key to alarm.

In addition to, or as an alternative to unlocking mounting devices, the key device may be useful for setting an alarm or turning an alarm ON or OFF. In this regard, to utilize the key device, a button on the key device may be actuated which indicates that the key is preparing to or is performing a locking or unlocking function. An indication that the button has been pressed may be commutated to the tag that is to be interacted with or the monitoring terminal. Further, in consideration of the locating functionality described below, the key device may be located and tracked, and zones of use (e.g., the key cannot be used in the stock room 110) and other rules may be defined and enforced with respect to the key.

As mentioned above, the key device can be configured to provide Geiger counter-type functionality. In this regard, the key device may be configured to provide audible and/or visual feedback to the user to indicate the location of a target tag. For example, the key device and/or the target tag may be configured to output audible beeps or clicks (similar to the sound of a Geiger counter), the frequency of which may increase as the key device moves closer to the target tag. The output may be based on locating that is performed via any means, including the ping nodes described in U.S. patent application Ser. Nos. 12/636,564, 12/628,863 and 12/887,228, or via signal strength detection directly between the locating tag and the target tag.

For example, a manager's key device may be used to locate tags that have reached a threshold battery charge level. A tag with a low battery level, where the tag includes battery monitoring circuitry (e.g., via a processor) may be configured to alarm locally to indicate the low battery condition. Additionally, a tag with low battery level may be configured to provide a wireless signal indicating the low battery condition. The wireless signal may be detected by the manager's key device and the key device may be configured to provide an indication of the location of the low battery level to a user of the locator tag (as described above in connection with FIG. 5).

A key device can also receive dynamic updates to its configuration data. For example, a tote of items can include an additional layer of security, which comprises assigning a special authorization code, sometimes referred to herein as a tote code, to the tote of items. Before the tote is shipped from a first location (such as a distributor or manufacturer) to a second location (such as a retail store), the tote code can be used to lock the tag affixed thereto.

Upon arrival at the second location, the tote may not be opened like another tag. For example, a manager's key device may not be able to decommission and unlock the tote's tag, even if the manager's key device has the highest level of authorization. Rather, the manager's key device may also need to be dynamically updated with the tote code. The tote code can be passed via the public Internet, closed network, flash memory drive, or by any other electronic means. Similarly, if the tote code is a series of numbers and letters, the first location manager can telephone the second location manager and verbally deliver the tote code. The second location manager may then enter the tote code into his already activated manager key device, and use the manager key device to decommission and unlock the tote.

Many modifications and other embodiments of the inventions set forth herein will come to mind to one skilled in the art to which these inventions pertain having the benefit of the teachings presented in the foregoing descriptions and the associated drawings. For example, in addition to key devices being implemented in a handheld, battery powered device (as shown in FIGS. 1B and 1C), key devices can also be integrated into furniture (such as a checkout counter) at point of sale stations, mains powered, and/or take any other form that enables the key device to perform at least some of the exemplary functionality discussed herein.

Therefore, it is to be understood that the inventions are not to be limited to the specific embodiments disclosed and that modifications and other embodiments are intended to be included within the scope of this disclosure. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of this disclosure. In this regard, for example, different combinations of elements and/or functions than those explicitly described above are also contemplated as may be set forth in some of this disclosure. Although specific terms are employed herein, they are used in a generic and descriptive sense only and not for purposes of limitation.

What is claimed is:

1. A method for decommissioning a tag, comprising:
   receiving at the tag a decommissioning signal from a key device;
   entering into a decommissioned state in response to receiving the decommissioning signal, wherein entering into the decommissioned state includes deactivating alarm functionality of the tag;
   transmitting a message to a monitoring system entity, the message indicating the tag is decommissioned, wherein the monitoring system entity is not the key device;
   prior to receiving the decommissioning signal, further comprising:
     receiving at the key device an activation code;
     generating activation data based on the activation code;
     transmitting the activation data wirelessly to a network entity;
     receiving, from the network entity, validation data indicating whether the activation data is valid; and
     in response to receiving the validation data that authenticates the activation data, activating configuration data at the key device, wherein the configuration data is associated with the activation data.

2. The method of claim 1, wherein activating the configuration data includes activating usage rules that include time-based rules.

3. The method of claim 1, wherein activating the configuration data includes activating usage rules that are location-based rules.

4. The method of claim 3, wherein activating the location-based rules enables the key device to function when the key device is in a retail store or retail mall.

5. The method of claim 1, wherein activating the configuration data includes activating usage rules, the method further comprising determining that at least one usage rule was violated.

6. The method of claim 5 further comprising generating a signal for transmission in response to determining the at least one usage rule was violated, the signal including rule violation data that indicates violation of the at least one usage rule.

7. The method of claim 5 further comprising temporarily locking the key device in response to determining a violation of the at least one of usage rule.

8. The method of claim 5 further comprising permanently disabling the key device in response to determining a violation of the at least one of usage rule.

9. The method of claim 5 further comprising providing reduced functionality in response to determining a violation of the at least one of usage rule.

10. The method of claim 5 further comprising alarming in response to determining a violation of the at least one of usage rule.

11. The method of claim 1 further comprising receiving a signal that indicates another key device has violated a usage rule associated with the key device.

12. The method of claim 1, wherein:
activating the configuration data includes activating usage rules, and determining that at least one of the usage rules is being satisfied.

13. The method of claim 1 further comprising:
receiving a tote code; and
in response to receiving the tote code, unlocking a tote tag.

14. The method of claim 1, wherein:
activating the configuration data includes activating usage rules, and
determining, at the network entity, that at least one of the usage rules is being satisfied.

15. The method of claim 1, wherein:
activating the configuration data includes activating usage rules, and
determining, at the network entity, that at least one of the usage rules is being violated.

16. The method of claim 1, further comprises providing the key device, including:
providing a wireless receiver configured to receive a wireless signal transmitted by a network entity of a monitoring system;
providing a wireless transmitter configured to transmit wireless signals to the network entity; and
providing a processor, wherein the processor is configured to:
receive the activation code;
generate activation data based on the activation code;
transmit the activation data using the wireless transmitter to the network entity;
receive, from the network entity, validation data indicating whether the activation data is valid; and
in response to receiving the validation data that authenticates the activation data, activate configuration data associated with the activation data.

17. A method for decommissioning a tag, comprising:
receiving at the tag a decommissioning signal from a key device;
entering into a decommissioned state in response to receiving the decommissioning signal, wherein entering into the decommissioned state includes deactivating alarm functionality of the tag;
transmitting a message to a monitoring system entity, the message indicating the tag is decommissioned, wherein the monitoring system entity is not the key device
prior to entering the decommissioned state:
obtaining barcode data using the key device;
receiving, at the monitoring system entity, the barcode data; and
verifying the barcode data matches tag data uploaded when the tag was commissioned.

18. The method of claim 17, wherein the entering into the decommissioned state is also in response to verifying the barcode data matches the tag data.

19. The method of claim 17 further comprising physically detaching from an item in response to the key device unlocking a mechanical lock included in the tag.

20. A method comprising:
receiving an activation code;
validating the activation code;
implementing configuration data and associated usage rules that enable functionality of the key device based on the activation code; and
generating, by a key device, a decommission signal for receipt by a tag to thereby cause the tag to be decommissioned, wherein being decommissioned includes deactivating an alarm of the tag;
wherein the key device includes components configured to interface with the tag to disable a mechanical locking mechanism of the tag.

21. The method of claim 20, wherein implementing configuration data and associated usage rules include implementing time-based rules, location-based rules, or user identity-based rules.

22. The method of claim 20, further comprising:
determining that at least one usage rule has been violated; and
disabling the key device in response to determining that the at least one usage rule has been violated.

23. The method of claim 20 further comprising receiving a tag alert signal indicating that a given tag is alarming.

24. The method of claim 20 further comprising remotely silencing an alarming tag.

25. The method of claim 20 further comprising displaying information provided by an external sensor on a display of the key device.

26. The method of claim 20, wherein causing the tag to be decommissioned includes causing the tag to be disassociated with an article to which the tag is affixed.

27. A key device comprising a processing circuitry, the processing circuitry being configured to at least:
receive an activation code;
validate the activation code;
implement configuration data and associated usage rules that enable functionality of the key device based on the activation code; and
generate a decommission signal for receipt by a tag to thereby cause the tag to be decommissioned, wherein being decommissioned includes deactivating an alarm of the tag;
wherein the key device includes components configured to interface with the tag to disable a mechanical locking mechanism of the tag.

28. The key device of claim 27, wherein the processing circuitry configured to implement configuration data and associated usage rules includes being configured to implement time-based rules, location-based rules, or user identity-based rules.

29. The key device of claim 27, wherein the processing circuitry is further configured to:
   determine that at least one usage rule has been violated; and
   disable the key device in response to determining that the at least one usage rule has been violated.

30. The key device of claim 27, wherein the processing circuitry is further configured to receive a tag alert signal indicating that a given tag is alarming.

31. The key device of claim 27, wherein the processing circuitry is further configured to remotely silence an alarming tag.

32. The key device of claim 27 further comprising a display; and
   wherein the processing circuitry is further configured to cause the display to display information provided by an external sensor.

33. The key device of claim 27, wherein the processing circuitry configured to cause the tag to be decommissioned includes being configured to cause the tag to be disassociated with an article to which the tag is affixed.

34. A method comprising:
   receiving, at a tag, a decommission signal from a key device;
   entering into a decommissioned state in response to receiving the decommission signal, wherein entering into the decommissioned state includes deactivating an alarm of the tag; and
   transmitting a message from the tag to a monitoring system entity indicating receipt of the decommission signal;
   wherein the tag includes a mechanical locking mechanism configured to interface with components of the key device to disable the mechanical locking mechanism.

35. The method of claim 34 further comprising:
   receiving an indication to silence an alarm from the key device; and
   silencing the alarm.

36. The method of claim 35, wherein transmitting the message to the monitoring system entity includes causing the tag to be disassociated with an article to which the tag is affixed.

37. A tag device comprising:
   a mechanical locking mechanism configured to interface with components of a key device to disable the mechanical locking mechanism; and
   processing circuitry configured to at least:
      receive a decommission signal from a key device;
      enter into a decommissioned state in response to receiving the decommission signal, wherein entering into the decommissioned state includes deactivating an alarm of the tag device; and
      cause transmission of a message from the tag device to a monitoring system entity indicating receipt of the decommission signal.

38. The tag device of claim 37, wherein the processing circuitry is further configured to:
   receive an indication to silence an alarm from the key device; and
   silence the alarm.

39. The tag device of claim 37, wherein the processing circuitry configured to cause transmission of the message to the monitoring system entity includes being configured to cause the tag to be disassociated with an article to which the tag is affixed.

* * * * *